US012634094B2

(12) United States Patent
Gong et al.

(10) Patent No.: US 12,634,094 B2
(45) Date of Patent: May 19, 2026

(54) METHOD FOR REDUCING PEAK-TO-AVERAGE POWER RATIO PAPR, AND COMMUNICATION APPARATUS

(71) Applicant: Huawei Technologies Co., Ltd., Shenzhen (CN)

(72) Inventors: Zhengwei Gong, Shanghai (CN); Yaqiu Peng, Shenzhen (CN); Yongchao Pan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 18/586,210

(22) Filed: Feb. 23, 2024

(65) Prior Publication Data

US 2024/0214170 A1 Jun. 27, 2024

Related U.S. Application Data

(63) Continuation of application No. PCT/CN2022/104909, filed on Jul. 11, 2022.

(30) Foreign Application Priority Data

Aug. 27, 2021 (CN) .......................... 202110994801.4

(51) Int. Cl.
*H04L 5/00* (2006.01)
*H04L 25/03* (2006.01)
*H04W 72/0453* (2023.01)

(52) U.S. Cl.
CPC .......... *H04L 5/0085* (2013.01); *H04L 5/0053* (2013.01); *H04L 25/03853* (2013.01); *H04W 72/0453* (2013.01)

(58) Field of Classification Search
CPC ................. H04L 5/0085; H04L 5/0053; H04L 25/03853; H04W 72/0453
See application file for complete search history.

(56) References Cited

U.S. PATENT DOCUMENTS

2015/0036764 A1    2/2015 Oh et al.
2019/0313436 A1*  10/2019 Lee ........................ H04L 5/0094
(Continued)

FOREIGN PATENT DOCUMENTS

CN    101374126 B    7/2012
CN    102624671 A    8/2012
(Continued)

OTHER PUBLICATIONS

Tellado-Mourelo, J., "Peak to Average Power Reduction for Multicarrier Modulation," Dissertation Submitted to The Department of Electricalengineering and The Committee on Graduate Studies of Stanforduniversity in Partial Fulfillment of The Requirements for Thedegree of Doctor of Philosophy, Sep. 1999, XP002463333, total 169 pages.

*Primary Examiner* — Sulaiman Nooristany
(74) *Attorney, Agent, or Firm* — Slater Matsil, LLP

(57) ABSTRACT

Embodiments of this application disclose a method for reducing a peak-to-average power ratio PAPR, and a communication apparatus, and are applied to a transmitting system including a power amplifier. In the method, a reserved resource may be determined based on a first unscheduled resource in transmission bandwidth and/or a second unscheduled resource in guard bandwidth, and a fixed reserved resource in a conventional technology does not need to be used. Therefore, flexibility of determining the reserved resource can be improved, and flexibility of reducing a peak-to-average power ratio PAPR in a frequency domain resource reservation TR manner can further be improved.

17 Claims, 8 Drawing Sheets

(56)        References Cited

U.S. PATENT DOCUMENTS

2020/0221474 A1 *  7/2020  Lee ....................... H04L 1/1896
2022/0263695 A1    8/2022  Oh et al.

FOREIGN PATENT DOCUMENTS

KR        20210033973  A      3/2021
WO         2018098692  A1      6/2018

* cited by examiner

METHOD FOR REDUCING PEAK-TO-AVERAGE POWER RATIO PAPR, AND COMMUNICATION APPARATUS

CROSS-REFERENCE TO RELATED APPLICATIONS

This application is a continuation of International Application No. PCT/CN2022/104909, filed on Jul. 11, 2022, which claims priority to Chinese Patent Application No. 202110994801.4, filed on Aug. 27, 2021. The disclosures of the aforementioned applications are hereby incorporated by reference in their entireties.

TECHNICAL FIELD

Embodiments of this application relate to the communication field, and in particular, to a method for reducing a peak-to-average power ratio (PAPR), and a communication apparatus.

BACKGROUND

In a wireless communication system, a signal that needs to be sent is usually converted into a radio frequency signal by using a structure such as a baseband module, a digital-to-analog conversion module (or an analog-to-digital conversion module), and a radio frequency module, and is radiated from an antenna. A power amplifier (PA) (which is referred to as the power amplifier for short) in the radio frequency module is responsible for power amplification of the signal, and performance of the power amplifier is very sensitive to an amplitude change of the signal. Usually, a peak-to-average power ratio (PAPR) of the signal is used to measure the amplitude change of the signal. If the PAPR of the signal is excessively large, an instantaneous peak value of the signal easily exceeds a peak value tolerance capability of the power amplifier. As a result, the power amplifier is burnt and destroyed. Therefore, clipping needs to be performed, by using a clipping technology, on the signal that needs to be sent, to reduce a value of the PAPR of the signal to a specific range, and ensure security of the power amplifier.

In a conventional technology, the peak-to-average power ratio PAPR is reduced usually in a manner of frequency domain resource reservation (TR). Specifically, a transmitting side generates a peak suppressing signal on a fixed reserved resource (namely, a TR resource) of the system, and superimposes the peak suppressing signal on a data signal that carries data, to reduce a peak-to-average power ratio PAPR of a to-be-transmitted signal.

However, the reserved resource in the conventional technology is a fixed frequency domain resource. In a long term evolution (LTE) system and a new radio (NR) system that both have flexible resource scheduling, the fixed reserved frequency domain resource not only affects flexibility of a scheduled resource and flexibility of the reserved resource that are on the transmitting side, but also increases complexity of a receiving side to some extent.

SUMMARY

Embodiments of this application provide a method for reducing a peak-to-average power ratio PAPR, and a communication apparatus, to improve flexibility of a reserved resource without increasing complexity of a receiving side, so as to improve flexibility of reducing a peak-to-average power ratio PAPR in a TR manner.

According to a first aspect, this application provides a method for reducing a peak-to-average power ratio PAPR. The method is applied to a communication apparatus including a power amplifier. The communication apparatus may determine a reserved resource based on an unscheduled resource in system bandwidth, generate a peak suppressing signal based on the reserved resource, and adjust, based on the peak suppressing signal, a peak-to-average power ratio PAPR of a to-be-transmitted data signal. The system bandwidth includes transmission bandwidth and guard bandwidth. The transmission bandwidth is near a center frequency, and the guard bandwidth is on two sides outside the transmission bandwidth. The unscheduled resource includes a first unscheduled resource in the transmission bandwidth and/or a second unscheduled resource in the guard bandwidth.

In this application, the reserved resource may be determined based on the first unscheduled resource in the transmission bandwidth and/or the second unscheduled resource in the guard bandwidth, and a fixed reserved resource in a conventional technology does not need to be used. Therefore, flexibility of determining the reserved resource can be improved, and flexibility of reducing the peak-to-average power ratio PAPR in a TR manner can further be improved. In addition, a receiving side (for example, a terminal device) does not receive data on the unscheduled resource (to be specific, the first unscheduled resource and the second unscheduled resource). Therefore, in a solution of determining the reserved resource based on the first unscheduled resource in the transmission bandwidth and/or the second unscheduled resource in the guard bandwidth, behavior of the receiving side does not need to be modified, and only a manner in which a transmitting side (for example, a base station) reserves a resource needs to be modified. Therefore, the flexibility of determining the reserved resource can be improved without increasing processing complexity of the receiving side, and the flexibility of reducing the peak-to-average power ratio PAPR in the TR manner can further be improved.

In a possible implementation, the first unscheduled resource includes an unscheduled frequency domain resource in a resource on a data channel and/or an unscheduled frequency domain resource in a resource on a control channel.

In this implementation, it is proposed that the unscheduled resource (to be specific, the first unscheduled resource) in the transmission bandwidth may include only the unscheduled frequency domain resource on the data channel, may include only the unscheduled frequency domain resource on the control channel, or may include both the unscheduled frequency domain resource on the data channel and the unscheduled frequency domain resource on the control channel. It should be understood that the first unscheduled resource may be caused by a channel resource allocation conflict, or may be caused because allocation is not performed due to poor link quality. This is not specifically limited in this application.

For example, the control channel may include one or more of a physical hybrid automatic repeat indicator channel (physical hybrid ARQ indicator channel, PHICH), a physical control format indicator channel (PCFICH), and a physical downlink control channel (PDCCH). The data channel may be a physical downlink shared channel (PDSCH). In a possible implementation, the communication apparatus may directly determine the unscheduled resource in the system bandwidth as the reserved resource. Optionally, when the unscheduled resource includes only the first unscheduled resource, the communication apparatus may determine the first unscheduled resource as the reserved resource. Optionally, when the unscheduled resource includes only the second unscheduled resource, the communication apparatus may determine the second unscheduled resource as the reserved resource. Optionally, when the unscheduled resource includes only the first unscheduled resource and the second unscheduled resource, the communication apparatus may determine a resource set including the first unscheduled resource and the second unscheduled resource as the reserved resource.

In a possible implementation, the communication apparatus may alternatively select, based on a rule, a part of the unscheduled resource in the system bandwidth as the reserved resource. Specifically, that the communication apparatus determines the reserved resource based on the unscheduled resource in the system bandwidth includes the communication apparatus determines the reserved resource based on the unscheduled resource and a first preset resource, where the first preset resource is a frequency domain resource whose probability of being scheduled is less than a preset value.

In this implementation, it is proposed that the communication apparatus may select a part of the unscheduled resource as the reserved resource with reference to a preset resource (to be specific, the first preset resource). That the first preset resource is a frequency domain resource whose probability of being scheduled is low may also be understood as that there is a high probability that each subcarrier in the first preset resource does not participate in scheduling. In different scheduling periodicities, unscheduled resources generated in the transmission bandwidth are not completely the same. Therefore, if the reserved resource is determined from the unscheduled resource with reference to the first preset resource, a resource that does not often participate in scheduling may be filtered from the unscheduled resource. This helps ensure relative stability of the determined reserved resource, and the reserved resource determined by the transmitting side (for example, the base station) does not remain unchanged. Therefore, the flexibility of determining the reserved resource is improved, and it can also be ensured that the receiving side (for example, the terminal device) is not affected.

Optionally, the first preset resource includes a plurality of subcarriers, and a quantity of subcarriers in a spacing between every two adjacent subcarriers in the plurality of subcarriers is not completely equal.

Further, if the plurality of subcarriers in the first preset resource are arranged in an unequal-spacing manner, in other words, a plurality of subcarriers in a first frequency domain resource are arranged in a non-uniform manner, suppression of wave peak regeneration is facilitated, and improving of efficiency of reducing the peak-to-average power ratio PAPR is facilitated.

In a possible implementation, the first preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal.

In this implementation, it is proposed that the consecutive subcarriers may exist in the first preset resource, but not all subcarriers are consecutive. The consecutive subcarriers help improve the efficiency of reducing the peak-to-average power ratio (PAPR), and different subcarriers included in different groups of frequency domain resources help form an arrangement manner of unequal spacings, so that wave peak regeneration is avoided, and the efficiency of reducing the peak-to-average power ratio (PAPR) can also be improved to some extent.

In a possible implementation, the first preset resource includes a frequency domain resource that is in the transmission bandwidth and that does not participate in scheduling and/or a frequency domain resource that is in the guard bandwidth and that does not participate in scheduling.

In this implementation, it is proposed that the first preset resource may include the frequency domain resource that is in the transmission bandwidth and that does not participate in scheduling, or may include the frequency domain resource that is in the guard bandwidth and that does not participate in scheduling. Optionally, the first preset resource may include both the two frequency domain resources. In this implementation, a plurality of manners of determining the first preset resource are provided, and a plurality of rules for determining the reserved resource are indirectly provided, to help improve the flexibility of determining the reserved resource.

In a possible implementation, that the communication apparatus determines the reserved resource based on the unscheduled resource and a first preset resource includes the communication apparatus determines an intersection set of the unscheduled resource and the first preset resource as the reserved resource.

In this implementation, it is proposed that the communication apparatus determines the intersection set of the unscheduled resource and the first preset resource as the reserved resource. In this implementation, it can be ensured that the reserved resource is an unscheduled frequency domain resource in the system bandwidth, and it can also be ensured that the reserved resource is a resource whose probability of being scheduled is low. In addition, a manner of determining the reserved resource by obtaining the intersection set of the unscheduled resource and the first preset resource is easy to operate, and helps avoid increasing complexity of determining the reserved resource by the communication apparatus.

In a possible implementation, the second unscheduled resource includes a first frequency domain resource that is in the guard bandwidth and that is adjacent to the transmission bandwidth, and a frequency domain resource quantity of the first frequency domain resource is less than a frequency domain resource quantity in the guard bandwidth. That the communication apparatus determines a reserved resource based on an unscheduled resource in system bandwidth may be specifically the communication apparatus determines the first frequency domain resource in the second unscheduled resource as the reserved resource.

In this implementation, it is proposed that the communication apparatus may further determine a part of frequency domain resources (to be specific, the first frequency domain resource) that is in the guard bandwidth and that is closely adjacent to the transmission bandwidth as the reserved resource. That the first frequency domain resource is closely adjacent to (or adjacent to) the transmission bandwidth indicates that no frequency domain resource exists between the first frequency domain resource and the transmission bandwidth. The communication apparatus selects, from the guard bandwidth, the part of frequency domain resources that is closely adjacent to the transmission bandwidth as the reserved resource, instead of directly using all the guard bandwidth as the reserved resource, to help reduce not only interference to a signal in another frequency band (for example, a frequency band other than the system bandwidth), but also a requirement of a filter of a transmitting system of the communication apparatus.

In a possible implementation, after the communication apparatus adjusts, based on the peak suppressing signal, the peak-to-average power ratio (PAPR) of the to-be-transmitted data signal, the communication apparatus may further adjust a parameter of the transmitting system to improve performance of the transmitting system. Specifically, an operating voltage of a power amplifier may be adjusted based on an adjusted peak-to-average power ratio (PAPR), or an average transmit power of the data signal may be adjusted based on an adjusted peak-to-average power ratio (PAPR).

According to a second aspect, this application provides another method for reducing a peak-to-average power ratio (PAPR). The method is applied to a communication apparatus including a power amplifier. The communication apparatus may determine a reserved resource based on a resource on a first-type channel in transmission bandwidth, where lower-order modulation is used for data and/or signaling scheduled on the first-type channel. The communication apparatus generates a peak suppressing signal based on the reserved resource. Then, the communication apparatus adjusts, based on the peak suppressing signal, a peak-to-average power ratio (PAPR) of a to-be-transmitted data signal.

In this application, the lower-order modulation is used for the data and/or a channel transmitted on the resource on the first-type channel, and an anti-interference capability is strong. Therefore, when the peak suppressing signal is generated on the resource on the first-type channel, not only effect of reducing the peak-to-average power ratio (PAPR) can be achieved, but also a demodulation process on a receiving side (for example, a terminal device) does not suffer great interference. In other words, the receiving side can still obtain a data signal by demodulating the first-type channel that carries the data signal and the peak suppressing signal. A fixed reserved resource in a conventional technology does not need to be used. Therefore, flexibility of determining the reserved resource is improved. In addition, the receiving side (for example, the terminal device) receives the data or the signaling by using the resource on the first-type channel. Therefore, behavior of the receiving side (for example, the terminal device) does not need to be modified when the resource on the first-type channel is used to determine the reserved resource.

In a possible implementation, the resource on the first-type channel includes a resource on a data channel and/or a resource on a control channel.

In this implementation, it is proposed that the resource on the first-type channel may include only a frequency domain resource on the data channel, may include only a frequency domain resource on the control channel, or may include both the frequency domain resource on the data channel and the frequency domain resource on the control channel.

In a possible implementation, the communication apparatus may alternatively select, based on a rule, a part of the resource on the first-type channel as the reserved resource. Specifically, that the communication apparatus determines a reserved resource based on a resource on a first-type channel includes the communication apparatus determines the reserved resource based on the resource on the first-type channel and a second preset resource, where the second preset resource is a resource whose anti-interference capability meets a preset condition.

In this implementation, it is proposed that the communication apparatus may select a part of the resource on the first-type channel as the reserved resource with reference to a preset resource (to be specific, the second preset resource). That the second preset resource is a resource whose anti-interference capability meets a preset condition may also be understood as that an anti-interference capability of a channel carried on the second preset resource is strong. In different scheduling periodicities, resources corresponding to channels that have a strong anti-interference capability and that are generated in the transmission bandwidth are not completely the same. Therefore, if the reserved resource is determined from the resource on the first-type channel with reference to the second preset resource, a resource with a strong anti-interference capability can be selected from the resource on the first-type channel. This helps ensure relative stability of the determined reserved resource, the reserved resource determined by a transmitting side (for example, a base station) does not remain unchanged. Therefore, the flexibility of determining the reserved resource is improved, and it can also be ensured that the receiving side (for example, the terminal device) is not affected.

Optionally, the second preset resource includes a plurality of subcarriers, and a quantity of subcarriers in a spacing between every two adjacent subcarriers in the plurality of subcarriers is not completely equal.

Further, the plurality of subcarriers in a first preset resource are arranged in an unequal-spacing manner, in other words, a plurality of subcarriers in a first frequency domain resource are arranged in a non-uniform manner, to help suppress wave peak regeneration, and help improve efficiency of reducing the peak-to-average power ratio (PAPR).

In a possible implementation, the second preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal.

In this implementation, it is proposed that the consecutive subcarriers may exist in the second preset resource, but not all subcarriers are consecutive. The consecutive subcarriers help improve the efficiency of reducing the peak-to-average power ratio (PAPR), and different subcarriers included in different groups of frequency domain resources help form an arrangement manner of unequal spacings, so that wave peak regeneration is avoided, and the efficiency of reducing the peak-to-average power ratio (PAPR) can also be improved to some extent.

In a possible implementation, the determining the reserved resource based on the resource on the first-type channel and a second preset resource includes determining an intersection set of the resource on the first-type channel and the second preset resource as the reserved resource.

In this implementation, it is proposed that the communication apparatus determines the intersection set of the unscheduled resource and the second preset resource as the reserved resource. In this implementation, it can be ensured that the reserved resource is the resource on the first-type channel (to be specific, the resource using the lower-order modulation), and it can also be ensured that the reserved resource is a resource with a strong anti-interference capability. In addition, a manner of determining the reserved resource by obtaining the intersection set of the resource on the first-type channel and the second preset resource is easy to operate, and helps avoid increasing complexity of determining the reserved resource by the communication apparatus.

In a possible implementation, the lower-order modulation is binary phase shift keying (BPSK) modulation or quadrature phase shift keying (QPSK) modulation.

In a possible implementation, after the communication apparatus adjusts, based on the peak suppressing signal, the peak-to-average power ratio (PAPR) of the to-be-transmitted data signal, the communication apparatus may further adjust a parameter of the transmitting system to improve performance of the transmitting system. Specifically, an operating voltage of a power amplifier may be adjusted based on an adjusted peak-to-average power ratio (PAPR), or an average transmit power of the data signal may be adjusted based on an adjusted peak-to-average power ratio (PAPR).

According to a third aspect, this application provides a communication apparatus, including a resource selection module and a signal generation module. The resource selection module is configured to determine a reserved resource based on an unscheduled resource in system bandwidth, where the system bandwidth includes transmission bandwidth and guard bandwidth, and the unscheduled resource includes a first unscheduled resource in the transmission bandwidth and/or a second unscheduled resource in the guard bandwidth. The signal generation module is configured to generate a peak suppressing signal based on the reserved resource, and adjust, based on the peak suppressing signal, a peak-to-average power ratio (PAPR) of a to-be-transmitted data signal.

In this embodiment, the reserved resource may be determined based on the first unscheduled resource in the transmission bandwidth and/or the second unscheduled resource in the guard bandwidth, and a fixed reserved resource in a conventional technology does not need to be used. Therefore, flexibility of determining the reserved resource can be improved. In addition, a receiving side (for example, a terminal device) does not receive data on the unscheduled resource (to be specific, the first unscheduled resource and the second unscheduled resource). Therefore, in a solution of determining the reserved resource based on the first unscheduled resource in the transmission bandwidth and/or the second unscheduled resource in the guard bandwidth, behavior of the receiving side does not need to be modified, and only a manner in which a transmitting side (for example, a base station) reserves a resource needs to be modified. Therefore, the flexibility of determining the reserved resource can be improved without increasing processing complexity of the receiving side.

In a possible implementation, the first unscheduled resource includes an unscheduled frequency domain resource in a resource on a data channel and/or an unscheduled frequency domain resource in a resource on a control channel.

In a possible implementation, the resource selection module is specifically configured to determine the reserved resource based on the unscheduled resource and a first preset resource. The first preset resource is a frequency domain resource whose probability of being scheduled is less than a preset value. The first preset resource includes a plurality of subcarriers. A quantity of subcarriers in a spacing between every two adjacent subcarriers in the plurality of subcarriers is not completely equal.

In a possible implementation, the first preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal.

In a possible implementation, the first preset resource includes a frequency domain resource that is in the transmission bandwidth and that does not participate in scheduling and/or a frequency domain resource that is in the guard bandwidth and that does not participate in scheduling.

In a possible implementation, the resource selection module is specifically configured to determine an intersection set of the unscheduled resource and the first preset resource as the reserved resource.

In a possible implementation, the second unscheduled resource includes a first frequency domain resource that is in the guard bandwidth and that is adjacent to the transmission bandwidth, and a frequency domain resource quantity of the first frequency domain resource is less than a frequency domain resource quantity in the guard bandwidth.

The resource selection module is specifically configured to determine the first frequency domain resource in the second unscheduled resource as the reserved resource.

In a possible implementation, the communication apparatus further includes a first adjustment module, configured to adjust an operating voltage of a power amplifier based on an adjusted peak-to-average power ratio (PAPR), or a second adjustment module, configured to adjust an average transmit power of the data signal based on an adjusted peak-to-average power ratio (PAPR).

It should be noted that, for this aspect and the implementations, refer to any one of the implementations and beneficial effects of the first aspect. Details are not described herein again.

According to a fourth aspect, this application provides a communication apparatus, including a resource selection module and a signal generation module. The resource selection module is configured to determine a reserved resource based on a resource on a first-type channel in transmission bandwidth, where lower-order modulation is used for data and/or signaling scheduled on the first-type channel. The signal generation module is configured to generate a peak suppressing signal based on the reserved resource, and adjust, based on the peak suppressing signal, a peak-to-average power ratio (PAPR) of a to-be-transmitted data signal.

In a possible implementation, the resource on the first-type channel includes a resource on a data channel and/or a resource on a control channel.

In a possible implementation, the resource selection module is specifically configured to determine the reserved resource based on the resource on the first-type channel and a second preset resource. The second preset resource includes a plurality of subcarriers. A quantity of subcarriers in a spacing between every two adjacent subcarriers in the plurality of subcarriers is not completely equal.

In a possible implementation, the second preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal.

In a possible implementation, the resource selection module is specifically configured to determine an intersection set of the resource on the first-type channel and the second preset resource as the reserved resource.

In a possible implementation, the lower-order modulation is binary phase shift keying BPSK modulation or quadrature phase shift keying QPSK modulation.

In a possible implementation, after adjusting, based on the peak suppressing signal, the peak-to-average power ratio (PAPR) of the to-be-transmitted data signal, the communication apparatus further includes a first adjustment module, configured to adjust an operating voltage of a power amplifier based on an adjusted peak-to-average power ratio (PAPR), or a second adjustment module, configured to adjust an average transmit power of the data signal based on an adjusted peak-to-average power ratio (PAPR).

It should be noted that, for this aspect and the implementations, refer to any one of the implementations and beneficial effects of the second aspect. Details are not described herein again.

According to a fifth aspect, an embodiment of this application provides a communication apparatus. The communication apparatus may be a network device (for example, a base station), or a baseband processing unit (building baseband unit, BBU) or baseband processing chip in a network device. The communication apparatus may include a processing module and a transceiver module. When the communication apparatus is a network device, the processing module may be a processor, and the transceiver module may be a transceiver. The network device may further include a storage module, and the storage module may be a memory. The storage module is configured to store instructions, and the processing module executes the instructions stored in the storage module, to enable the network device to perform the method in any one of the first aspect or the implementations of the first aspect, or perform the method in any one of the second aspect or the implementations of the second aspect. When the communication apparatus is a chip in a network device, the processing module may be a processor, and the transceiver module may be an input/output interface, a pin, a circuit, or the like. The processing module executes instructions stored in a storage module, to enable the network device to perform the method in any one of the first aspect or the implementations of the first aspect, or perform the method in any one of the second aspect or the implementations of the second aspect. The storage module may be a storage module (for example, a register or a cache) in the chip, or may be a storage module (for example, a read-only memory or a random access memory) that is in the network device and that is located outside the chip.

According to a sixth aspect, this application provides a communication apparatus. The apparatus may be an integrated circuit chip. The integrated circuit chip includes a processor. The processor is coupled to a memory. The memory is configured to store a program or instructions. When the program or the instructions are executed by the processor, the communication apparatus is enabled to perform the method in any one of the first aspect or the implementations of the first aspect, or perform the method in any one of the second aspect or the implementations of the second aspect.

According to a seventh aspect, an embodiment of this application provides a computer program product including instructions. When the computer program product runs on a computer, the computer is enabled to perform the method in any one of the first aspect, the second aspect, and the implementations of the foregoing aspects.

According to an eighth aspect, an embodiment of this application provides a computer-readable storage medium, including instructions. When the instructions are run on a computer, the computer is enabled to perform the method in any one of the first aspect, the second aspect, and the implementations of the foregoing aspects.

According to the foregoing technical solutions, it can be learned that embodiments of this application have the following advantages.

In this application, the reserved resource may be determined based on the first unscheduled resource in the transmission bandwidth and/or the second unscheduled resource in the guard bandwidth, and the fixed reserved resource in the conventional technology does not need to be used. Therefore, the flexibility of determining the reserved resource can be improved. In addition, the receiving side (for example, the terminal device) does not receive data on the unscheduled resource (to be specific, the first unscheduled resource and the second unscheduled resource). Therefore, in the solution of determining the reserved resource based on the first unscheduled resource in the transmission bandwidth and/or the second unscheduled resource in the guard bandwidth, the behavior of the receiving side does not need to be modified, and only the manner in which the transmitting side (for example, the base station) reserves a resource needs to be modified. Therefore, the processing complexity of the receiving side is not increased.

In this application, the lower-order modulation is used for the data and/or a channel transmitted on the resource on the first-type channel, and the anti-interference capability is strong. Therefore, when the peak suppressing signal is generated on the resource on the first-type channel, not only the effect of reducing the peak-to-average power ratio (PAPR) can be achieved, but also the demodulation process on the receiving side (for example, the terminal device) does not suffer great interference. In other words, the receiving side can still obtain a data signal by demodulating the first-type channel that carries the data signal and the peak suppressing signal. The fixed reserved resource in the conventional technology does not need to be used. Therefore, the flexibility of determining the reserved resource is improved. In addition, the receiving side (for example, the terminal device) receives the data or the signaling by using the resource on the first-type channel. Therefore, the behavior of the receiving side (for example, the terminal device) does not need to be modified when the resource on the first-type channel is used to determine the reserved resource.

BRIEF DESCRIPTION OF THE DRAWINGS

To describe the technical solutions in embodiments of this application more clearly, the following briefly describes the accompanying drawings for describing embodiments. It is clear that the accompanying drawings in the following descriptions show merely some embodiments of this application.

DETAILED DESCRIPTION OF ILLUSTRATIVE EMBODIMENTS

The following clearly and completely describes the technical solutions in embodiments of this application with reference to the accompanying drawings in embodiments of this application. It is clear that the described embodiments are merely a part of but not all of embodiments of this application.

In the specification, claims, and accompanying drawings of this application, terms "first", "second", "third", "fourth", and the like (if existent) are intended to distinguish between similar objects but do not necessarily indicate a specific order or sequence. It should be understood that the terms used in such a way are interchangeable in proper circumstances so that embodiments described herein can be implemented in other orders than the order illustrated or described herein. In addition, terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

A method that is for reducing a peak-to-average power ratio (PAPR) and that is provided in this application may be applied to a transmitting system including a power amplifier, and a communication apparatus provided in this application may be used in the transmitting system including the power amplifier. The transmitting system is, for example, a transmitting system in a 5G NR high-frequency scenario, or another transmitting system in which an extremely high peak-to-average power ratio (PAPR) may be generated. This is not specifically limited herein. The communication apparatus may be a network device, for example, an access network device, a base station, or an access point. Alternatively, the communication apparatus may be a processing unit (for example, a BBU) or processing chip (for example, a baseband processing chip) in a network device (for example, a base station or an access point).

Figure 1:
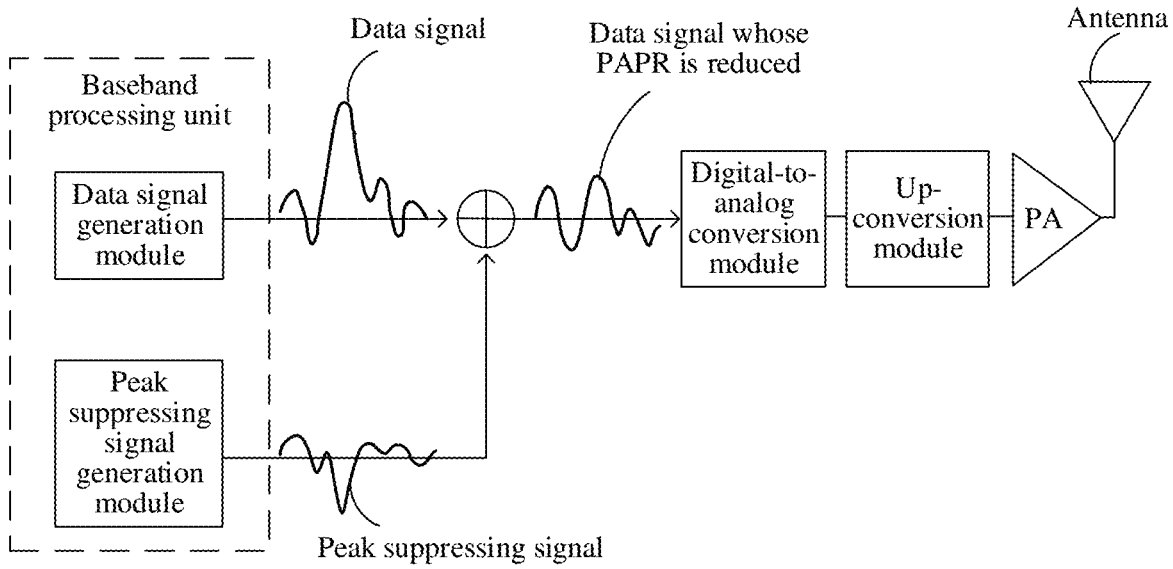
FIG. 1 is a diagram of a principle of a method for reducing a peak-to-average power ratio (PAPR) according to this application.

The following briefly describes, with reference to FIG. 1, a principle of the method that is for reducing a peak-to-average power ratio (PAPR) and that is provided in this application.

As shown in FIG. 1, a baseband processing unit in a communication apparatus includes a data signal generation module and a peak suppressing signal generation module. A data channel generation module is configured to generate a data signal on a resource on a data channel and/or a resource on a control channel on transmission bandwidth, where the data signal carries data and/or signaling to be transmitted by a transmitting side (for example, a base station) to a receiving side (for example, a terminal device). The peak suppressing signal generation module is configured to generate a peak suppressing signal on a reserved resource. Then, the peak suppressing signal is superimposed on the data signal, to generate a data signal whose PAPR is reduced. After digital-to-analog conversion and up-conversion processing are performed on the data signal whose PAPR is reduced, the data signal arrives at a power amplifier, and is amplified by the power amplifier and then radiated from an antenna.

In this application, based on the foregoing principle, the reserved resource is properly selected, to reduce the PAPR of the data signal without increasing processing complexity of the receiving side (for example, the terminal device).

Figure 2:
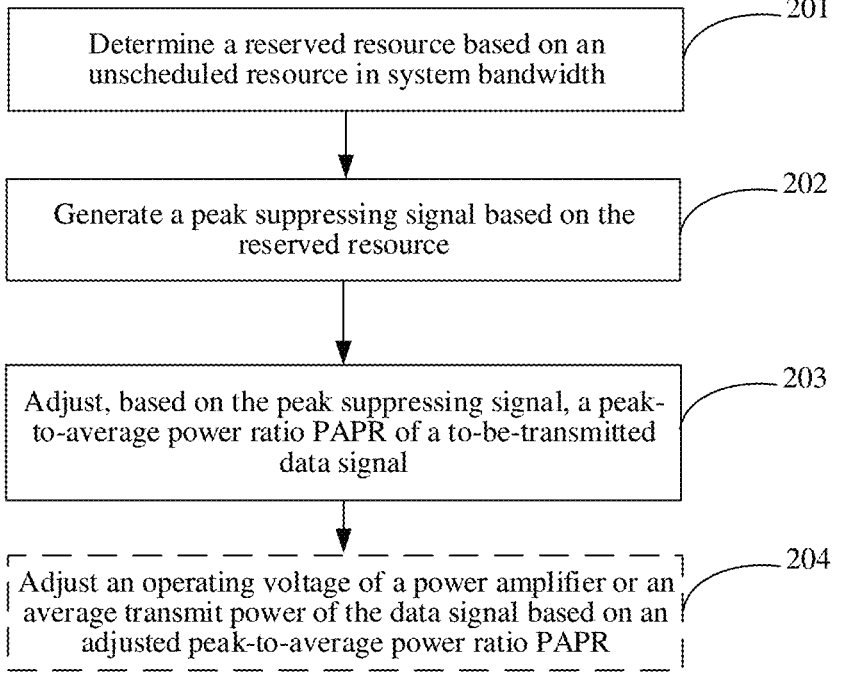
FIG. 2 is a flowchart of a method for reducing a peak-to-average power ratio (PAPR) according to this application.

FIG. 2 shows an embodiment of a method for reducing a peak-to-average power ratio (PAPR) according to this application. The communication apparatus performs the following steps.

Step 201: Determine a reserved resource based on an unscheduled resource in system bandwidth.

Figure 3A:
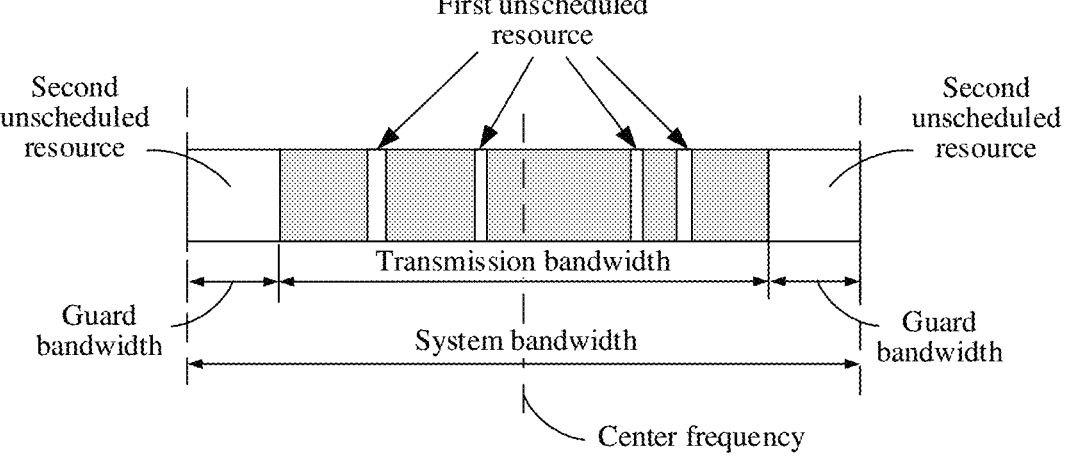
FIG. 3A is a schematic diagram of an embodiment of an unscheduled resource in system bandwidth according to this application.

The system bandwidth is basic bandwidth that is for system deployment and that is determined by the frequency management committee. As shown in FIG. 3A, bandwidth that is in the system bandwidth and that is for transmitting a desired signal is transmission bandwidth, and the transmission bandwidth is near a center frequency. Usually, the transmission bandwidth is less than the system bandwidth, and a frequency domain resource part that is other than the transmission bandwidth and that is in the system bandwidth is usually referred to as guard bandwidth. The guard bandwidth may be understood as a frequency domain resource that is specified not to be used to transmit signaling or data to avoid interference caused by different system bandwidth. The guard bandwidth is on two sides of the transmission bandwidth.

The unscheduled resource is a resource that is not used by the communication apparatus for data or signaling scheduling. To be specific, the communication apparatus serving as a transmitting side does not send, on the unscheduled resource, data and/or signaling to a terminal device serving as a receiving side, and the communication apparatus serving as the transmitting side does not indicate, in another signaling or message, the terminal device to receive the data and/or the signaling on the unscheduled resource. A frequency domain position at which the terminal device receives the data or the signaling is indicated by the communication apparatus, and the terminal device does not receive the data or the signaling on a frequency domain resource that is not indicated by the communication apparatus. Therefore, the unscheduled resource may also be understood as a frequency domain resource on which the terminal device does not receive the data or the signaling.

It should be understood that the unscheduled resource may be variable, in other words, the unscheduled resource is not necessarily fixed. Optionally, in different scheduling periodicities, unscheduled resources in the system bandwidth are not necessarily the same. For example, in a previous scheduling periodicity, the unscheduled resource in the system bandwidth occupies N resource blocks RBs. In a next scheduling periodicity, the unscheduled resource in the system bandwidth occupies M resource blocks RBs. Frequency domain positions occupied by the N RBs and the M RBs in the system bandwidth are not necessarily the same. N and M are integers greater than 0, and N and M are not necessarily the same.

Specifically, as shown in FIG. 3A, the unscheduled resource includes a first unscheduled resource in the transmission bandwidth and/or a second unscheduled resource in the guard bandwidth. The first unscheduled resource may be caused by a channel resource allocation conflict, or may be caused because allocation is not performed due to poor link quality. This is not specifically limited in this application. The second unscheduled resource is a resource that is in the guard bandwidth and that does not participate in scheduling.

Optionally, the first unscheduled resource includes an unscheduled frequency domain resource in a resource on a data channel and/or an unscheduled frequency domain resource in a resource on a control channel. Specifically, the unscheduled resource (to be specific, the first unscheduled resource) in the transmission bandwidth may include only the unscheduled frequency domain resource on the data channel, may include only the unscheduled frequency domain resource on the control channel, or may include both the unscheduled frequency domain resource on the data channel and the unscheduled frequency domain resource on the control channel. This is not specifically limited herein. For example, the control channel may include one or more of a physical hybrid automatic repeat indicator channel (physical hybrid ARQ indicator channel, PHICH), a physical control format indicator channel (PCFICH), and a physical downlink control channel (PDCCH). The data channel may be a physical downlink shared channel (PDSCH).

It should be understood that, the unscheduled resource in the transmission bandwidth in each scheduling periodicity is not necessarily the same. Therefore, first unscheduled resources determined by the communication apparatus in different scheduling periodicities are not necessarily the same. The communication apparatus may determine a scheduled resource based on a requirement of the communication apparatus, and then determine the reserved resource based on the unscheduled resource. Therefore, the solution provided in this application not only does not affect flexibility of resource scheduling performed by the communication apparatus, but also improves flexibility of determining the reserved resource in comparison with setting a fixed reserved resource.

In this embodiment, the communication apparatus may determine the reserved resource based on the unscheduled resource in the system bandwidth in a plurality of manners. The manners are separately described below.

Figure 3B:
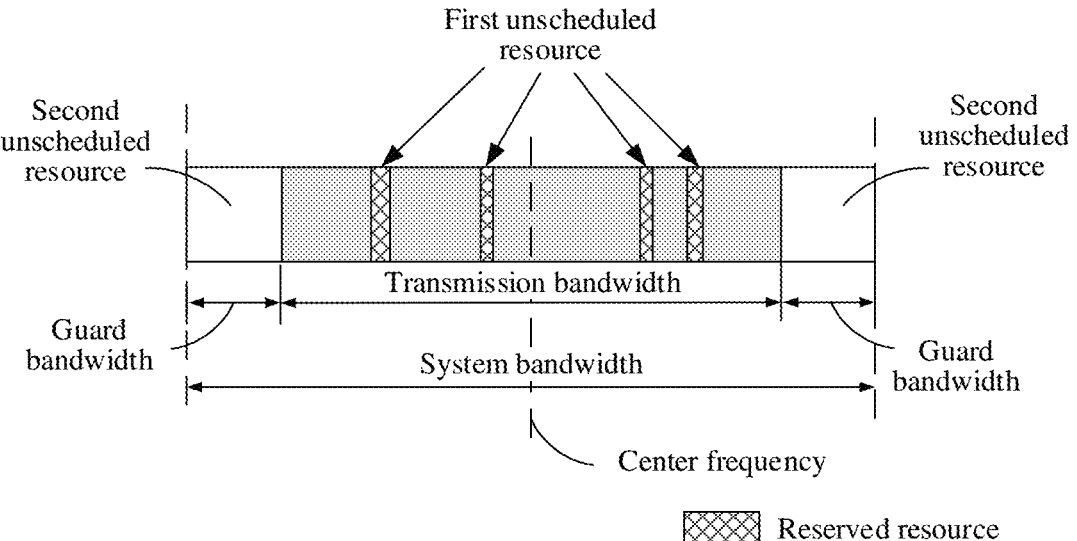
FIG. 3B is a schematic diagram of an embodiment of a determined reserved resource according to this application.
Figure 3C:
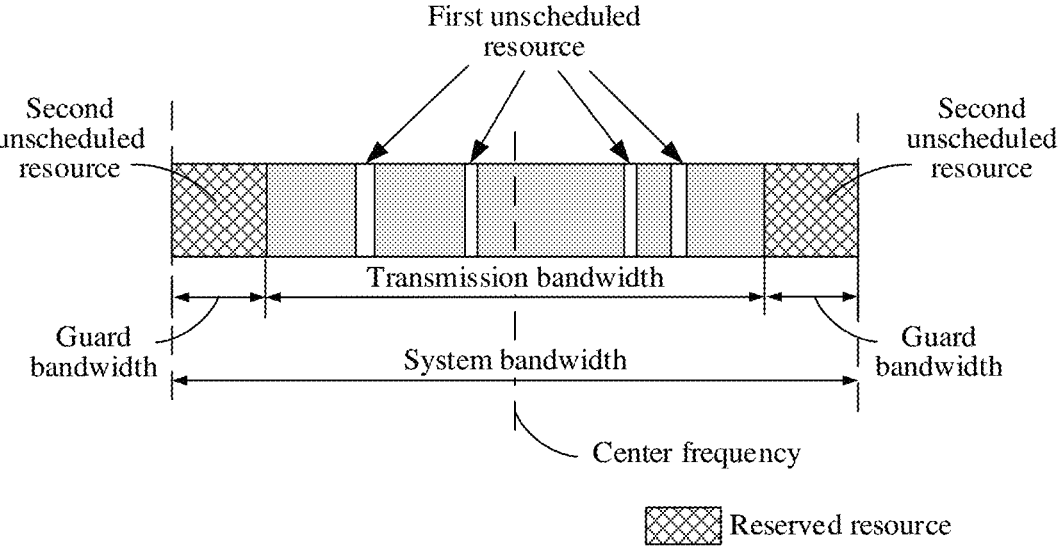
FIG. 3C is a schematic diagram of another embodiment of a determined reserved resource according to this application.
Figure 3D:
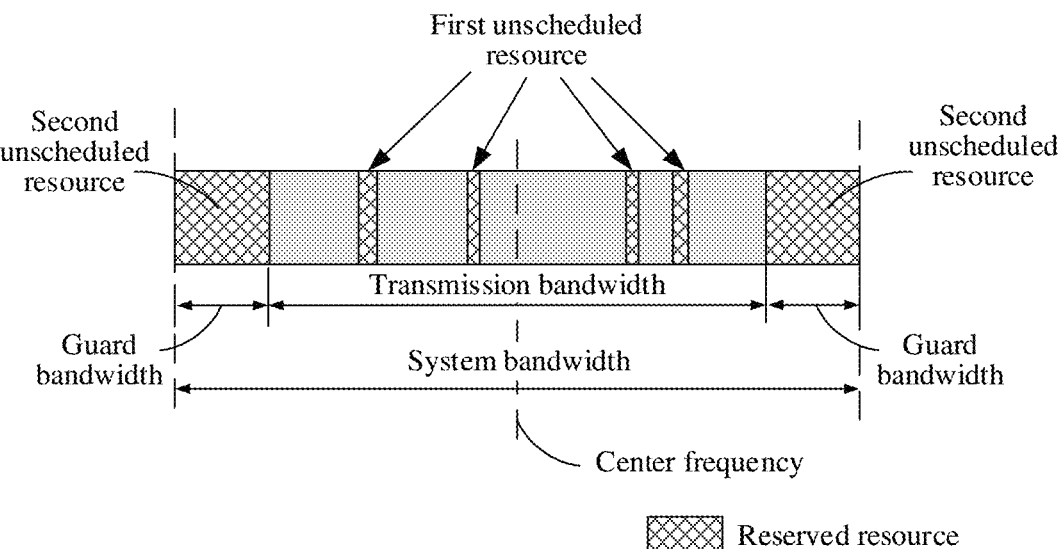
FIG. 3D is a schematic diagram of another embodiment of a determined reserved resource according to this application.

In an optional implementation, the communication apparatus may directly determine the unscheduled resource in the system bandwidth as the reserved resource. Optionally, as shown in FIG. 3B, the communication apparatus may determine the first unscheduled resource as the reserved resource. Optionally, as shown in FIG. 3C, the communication apparatus may determine the second unscheduled resource as the reserved resource. Optionally, as shown in FIG. 3D, the communication apparatus may determine a resource set including the first unscheduled resource and the second unscheduled resource as the reserved resource.

In this implementation, the unscheduled resource in each scheduling periodicity is not necessarily the same. Therefore, the first unscheduled resource and/or the second unscheduled resource determined by the communication apparatus in each scheduling periodicity are/is not necessarily the same. Therefore, the reserved resource is determined based on the first unscheduled resource and/or the second unscheduled resource. This helps improve the flexibility of determining the reserved resource by the communication apparatus, and further improves flexibility of reducing the peak-to-average power ratio (PAPR) in a TR manner. In addition, a resource on which the receiving side (for example, the terminal device) receives the data or the signaling is determined based on the resource scheduling performed by the transmitting side (for example, the base station), and the transmitting side does not indicate the receiving side to receive the data or the signaling on the unscheduled resource. Therefore, behavior of the receiving side does not need to be modified, and complexity of the receiving side is not increased.

In another optional implementation, the communication apparatus may alternatively select, based on a rule, a part of the unscheduled resource in the system bandwidth as the reserved resource.

Specifically, the communication apparatus determines the reserved resource based on the unscheduled resource and a first preset resource. That the first preset resource is a frequency domain resource whose probability of being scheduled is low may also be understood as that there is a high probability that each subcarrier in the first preset resource does not participate in scheduling. The first preset resource may be determined based on historical scheduling information, and the historical scheduling information indicates a position of a time-frequency resource that is not scheduled in a scheduling periodicity before a current moment. For example, the communication apparatus collects distribution positions of a plurality of unscheduled resources that appear in the scheduling periodicity, and then determines, as the first preset resource, a resource that appears frequently. In addition, the communication apparatus may further determine, based on analog simulation, a frequency domain position at which a scheduled resource easily appears in the system bandwidth, and then determine a resource at the frequency domain position as the first preset resource. During actual application, the first preset resource may alternatively be determined in another manner. This is not specifically limited herein.

Figure 3E:
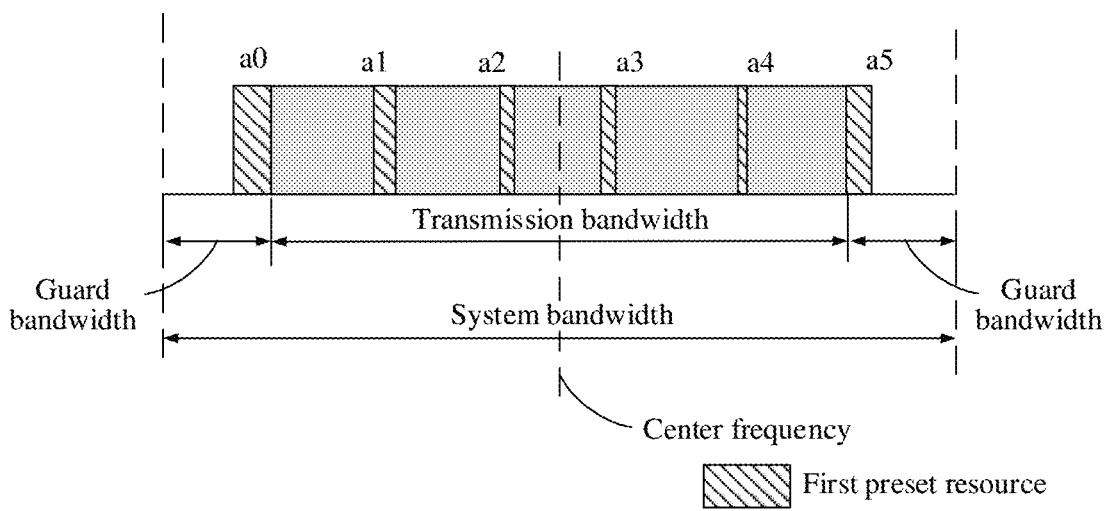
FIG. 3E is a diagram of an example of a first preset resource according to this application.

In addition, the first preset resource includes a frequency domain resource that is in the transmission bandwidth and that does not participate in scheduling and/or a frequency domain resource that is in the guard bandwidth and that does not participate in scheduling. FIG. 3E is used as an example. The unscheduled resource included in the system bandwidth include a resource a0, a resource a1, a resource a2, a resource a3, a resource a4, and a resource a5. The resource a0 and the resource a5 are both frequency domain resources that are in the guard bandwidth and that do not participate in scheduling. The resource a1, the resource a2, the resource a3, and the resource a4 are frequency domain resources that are in the transmission bandwidth and that do not participate in scheduling. The first preset resource may include one or more groups of the resource a0, the resource a1, the resource a2, the resource a3, the resource a4, and the resource a5. In an example, the first preset resource includes the resource a1, the resource a2, the resource a3, and the resource a4. In another example, the first preset resource includes the resource a0 and the resource a5. In another example, the first preset resource includes the resource a0, the resource a1, the resource a2, the resource a3, the resource a4, and the resource a5.

Optionally, the first preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal. As shown in FIG. 3E, an example in which the first preset resource includes the resource a0, the resource a1, the resource a2, the resource a3, the resource a4, and the resource a5 is used. In this case, the first preset resource includes five groups of consecutive frequency domain resources, and a quantity of subcarriers included in the resource a0 is not necessarily the same as a quantity of subcarriers included in the resource a1. Similarly, a quantity of subcarriers included in another group of resources is not necessarily the same.

Optionally, the first preset resource includes a plurality of subcarriers, and a quantity of subcarriers in a spacing between every two adjacent subcarriers in the plurality of subcarriers is not completely equal. FIG. 3E is used as an example. A quantity of subcarriers in a spacing between the $1^{st}$ subcarrier in the resource a0 and the $1^{st}$ subcarrier in the resource a1 is not necessarily equal to a quantity of subcarriers in a spacing between the $1^{st}$ subcarrier in the resource a1 and the $1^{st}$ subcarrier in the resource a2. In this implementation, the plurality of subcarriers in the first preset resource are arranged in an unequal-spacing manner, in other words, a plurality of subcarriers in a first frequency domain resource are arranged in a non-uniform manner, to help suppress wave peak regeneration, and help improve efficiency of reducing the peak-to-average power ratio (PAPR).

It should be understood that a frequency domain position of the first preset resource may be stored in the communication apparatus as a template, and the communication apparatus stores frequency domain positions of one or more first preset resources. The communication apparatus may store an index value of a resource group, an index value of a resource block, or an index value of a subcarrier. This is not specifically limited herein.

For example, the first preset resource in FIG. 3E may be stored in the communication apparatus in a manner shown in Table 1-1.

TABLE 1-1

| | Index value of a resource group | | | | | |
| --- | --- | --- | --- | --- | --- | --- |
| | a0 | a1 | a2 | a3 | a4 | a5 |
| Index value of an RB | 2 to 4 | 9 and 10 | 20 | 30 | 40 | 45 to 48 |

For example, the frequency domain position of the first preset resource may be alternatively stored in the communication apparatus in a form of a bitmap (bitmap).

It should be understood that, during actual application, processing such as compression may be performed on the frequency domain position of the first preset resource. Therefore, a storage form of the first preset resource in the communication apparatus is not limited in this application.

In this implementation, the communication apparatus may select a part of the unscheduled resource as the reserved resource with reference to the preset resource (to be specific, the first preset resource). That the first preset resource is a frequency domain resource whose probability of being scheduled is low may also be understood as that there is a high probability that each subcarrier in the first preset resource does not participate in scheduling. In different scheduling periodicities, unscheduled resources generated in the transmission bandwidth are not completely the same. Therefore, if the reserved resource is determined from the unscheduled resource with reference to the first preset resource, a resource that does not often participate in scheduling may be filtered from the unscheduled resource. This helps ensure relative stability of the determined reserved resource, and the reserved resource determined by the transmitting side (for example, the base station) does not remain unchanged. Therefore, the flexibility of determining the reserved resource is improved, and it can also be ensured that the receiving side (for example, the terminal device) is not affected.

Figure 3F:
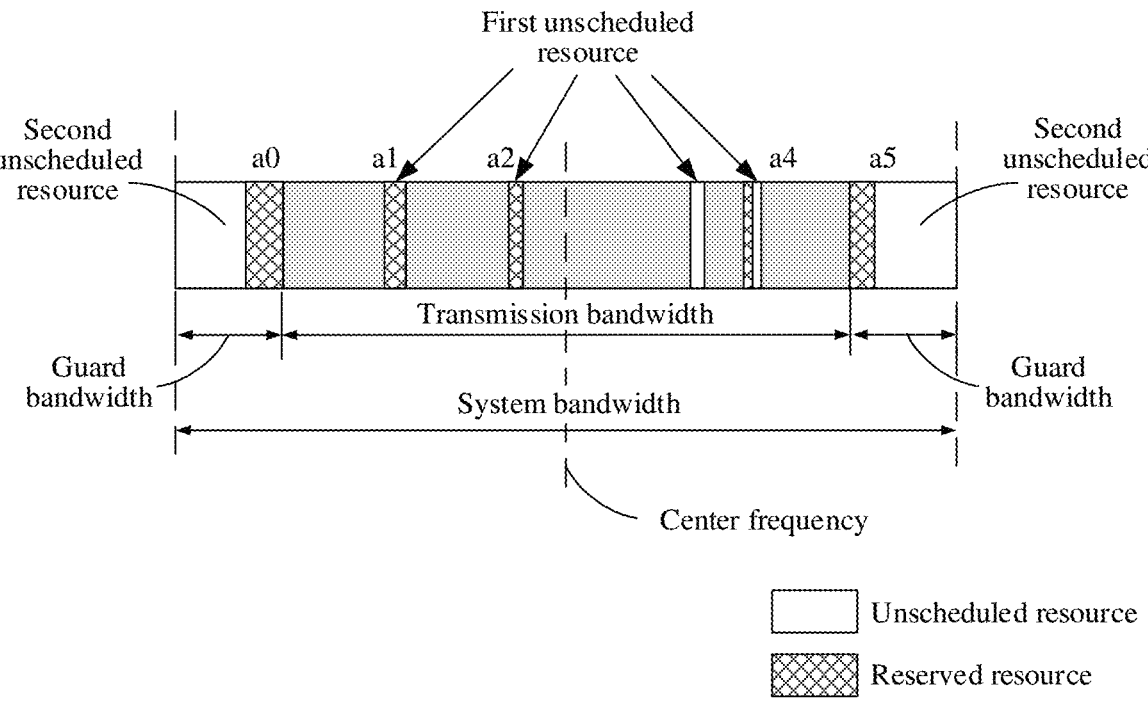
FIG. 3F is a schematic diagram of another embodiment of a determined reserved resource according to this application.

Optionally, the communication apparatus determines an intersection set of the unscheduled resource and the first preset resource as the reserved resource. As shown in FIG. 3F, the communication apparatus obtains the intersection set of the first preset resource in the example shown in FIG. 3E and the unscheduled resource in the system bandwidth, to obtain five groups of resources: the resource a0, the resource a1, the resource a2, the resource a4, and the resource a5. The communication apparatus determines the five groups of resources as the reserved resource. In this implementation, it can be ensured that the reserved resource is an unscheduled frequency domain resource in the system bandwidth, and it can also be ensured that the reserved resource is a resource whose probability of being scheduled is low. In addition, a manner of determining the reserved resource by obtaining the intersection set of the unscheduled resource and the first preset resource is easy to operate, and helps avoid increasing complexity of determining the reserved resource by the communication apparatus.

In another optional implementation, the communication apparatus may alternatively select only a part of the second unscheduled resource in the guard bandwidth as the reserved resource. Specifically, the communication apparatus may select a part that is of the second unscheduled resource and that is close to the transmission bandwidth as the reserved resource. In comparison with using the entire second unscheduled resource in the guard bandwidth as the reserved resource, this helps reduce a requirement on a filter, and reduces implementation complexity.

Figure 3G:
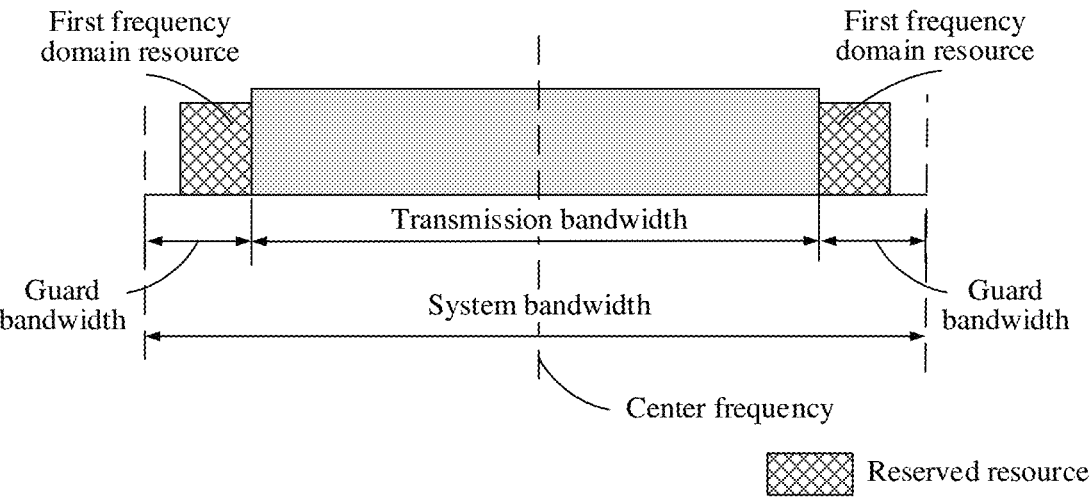
FIG. 3G is a schematic diagram of another embodiment of a determined reserved resource according to this application.

As shown in FIG. 3G, the second unscheduled resource includes a first frequency domain resource that is in the guard bandwidth and that is adjacent to the transmission bandwidth, and a frequency domain resource quantity of the first frequency domain resource is less than a frequency domain resource quantity in the guard bandwidth. The communication apparatus may determine the first frequency domain resource in the second unscheduled resource as the reserved resource. Optionally, the first frequency domain resource may be symmetrically distributed relative to a center frequency. The communication apparatus may further determine a part of frequency domain resources (to be specific, the first frequency domain resource) that is in the guard bandwidth and that is closely adjacent to the transmission bandwidth as the reserved resource. That the first frequency domain resource is closely adjacent to (or adjacent to) the transmission bandwidth indicates that no frequency domain resource exists between the first frequency domain resource and the transmission bandwidth. The communication apparatus selects, from the guard bandwidth, the part of frequency domain resources that is closely adjacent to the transmission bandwidth as the reserved resource, instead of directly using all the guard bandwidth as the reserved resource, to help reduce not only interference to a signal in another frequency band (for example, a frequency band other than the system bandwidth), but also a requirement of a filter of a transmitting system of the communication apparatus.

Step 202: Generate a peak suppressing signal based on the reserved resource.

In this embodiment, the communication apparatus generates the peak suppressing signal on the reserved resource.

Step 203: Adjust, based on the peak suppressing signal, a peak-to-average power ratio (PAPR) of a to-be-transmitted data signal.

In this embodiment, the communication apparatus superimposes, on the to-be-transmitted data signal, the peak suppressing signal generated on the reserved resource, to obtain a data signal whose peak-to-average power ratio (PAPR) is reduced.

Step 204: Adjust an operating voltage of a power amplifier or an average transmit power of the data signal based on an adjusted peak-to-average power ratio (PAPR).

In this embodiment, step 204 is an optional step. In other words, after the communication apparatus adjusts, based on the peak suppressing signal, the peak-to-average power ratio (PAPR) of the to-be-transmitted data signal, the communication apparatus may further adjust a parameter of the transmitting system to improve performance of the transmitting system. The parameter of the transmitting system includes the operating voltage of the power amplifier and the average transmit power of the data signal.

In a possible implementation, the power amplifier stores a table of a correspondence relationship between a PAPR level and the operating voltage. If the communication apparatus reduces the PAPR, the communication apparatus may send an adjustment indication to the power amplifier, to indicate the power amplifier to adjust the operating voltage to an operating voltage corresponding to a PAPR level, so as to improve operating performance of the transmitting system.

For example, the table of the correspondence relationship between the PAPR level and the operating voltage in the power amplifier may be shown in Table 2-1.

TABLE 2-1

| PAPR level 1 | Operating voltage 1 |
| PAPR level 2 | Operating voltage 2 |

The PAPR level 1 is lower than the PAPR level 2, and the operating voltage 1 is less than the operating voltage 2. It should be understood that values of the operating voltage 1 and the operating voltage 2 are related to the power amplifier during actual application. A specific value of the operating voltage is not limited in this application.

In another possible implementation, the communication apparatus stores a table of a correspondence relationship between a PAPR level and an average transmit power. If the communication apparatus reduces the PAPR, the communication apparatus may reduce the average transmit power of the data signal, so that the power amplifier uses a low average transmit power when amplifying the data signal, to improve the operating performance of the transmitting system.

For example, the table of the correspondence relationship between the PAPR level and the average transmit power in the power amplifier may be shown in Table 2-2.

TABLE 2-2

| PAPR level 1 | Average transmit power 1 |
| PAPR level 2 | Average transmit power 2 |

The PAPR level 1 is lower than the PAPR level 2, and the average transmit power 1 is less than the average transmit power 2. It should be understood that values of the average transmit power 1 and the average transmit power 2 are related to the power amplifier and the baseband processing unit in the communication apparatus during actual application. A specific value of the operating voltage is not limited in this application.

In this embodiment, the reserved resource may be determined based on the first unscheduled resource in the transmission bandwidth and/or the second unscheduled resource in the guard bandwidth, and a fixed reserved resource in a conventional technology does not need to be used. Therefore, flexibility of determining the reserved resource can be improved. In addition, a receiving side (for example, a terminal device) does not receive data on the unscheduled resource (to be specific, the first unscheduled resource and the second unscheduled resource). Therefore, in a solution of determining the reserved resource based on the first unscheduled resource in the transmission bandwidth and/or the second unscheduled resource in the guard bandwidth, behavior of the receiving side does not need to be modified, and only a manner in which a transmitting side (for example, a base station) reserves a resource needs to be modified. Therefore, the flexibility of determining the reserved resource can be improved without increasing processing complexity of the receiving side.

Figure 4:
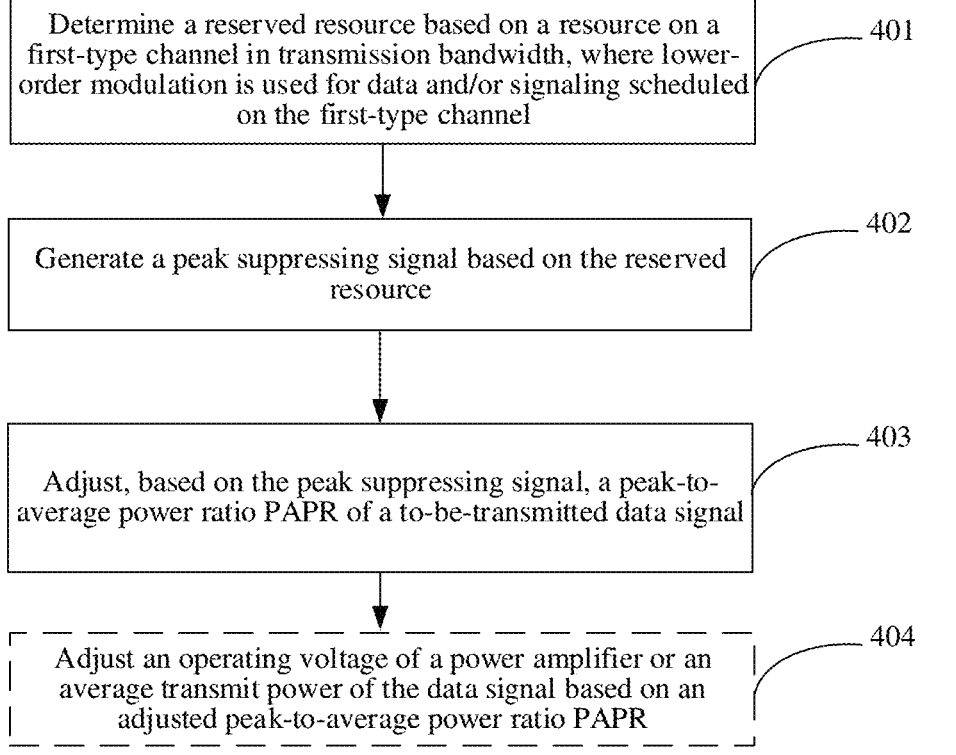
FIG. 4 is another flowchart of a method for reducing a peak-to-average power ratio (PAPR) according to this application.

FIG. 4 shows another embodiment of a method for reducing a peak-to-average power ratio (PAPR) according to this application. The communication apparatus performs the following steps.

Step 401: Determine a reserved resource based on a resource on a first-type channel in transmission bandwidth, where lower-order modulation is used for data and/or signaling scheduled on the first-type channel.

The lower-order modulation is a modulation manner with a strong anti-interference capability. Therefore, the resource on the first-type channel may be understood as a resource on a channel whose anti-interference capability meets a preset condition, for example, a resource on a channel whose anti-interference capability is strong. For example, the lower-order modulation is binary phase shift keying (BPSK) modulation or quadrature phase shift keying (QPSK) modulation.

Figure 5A:
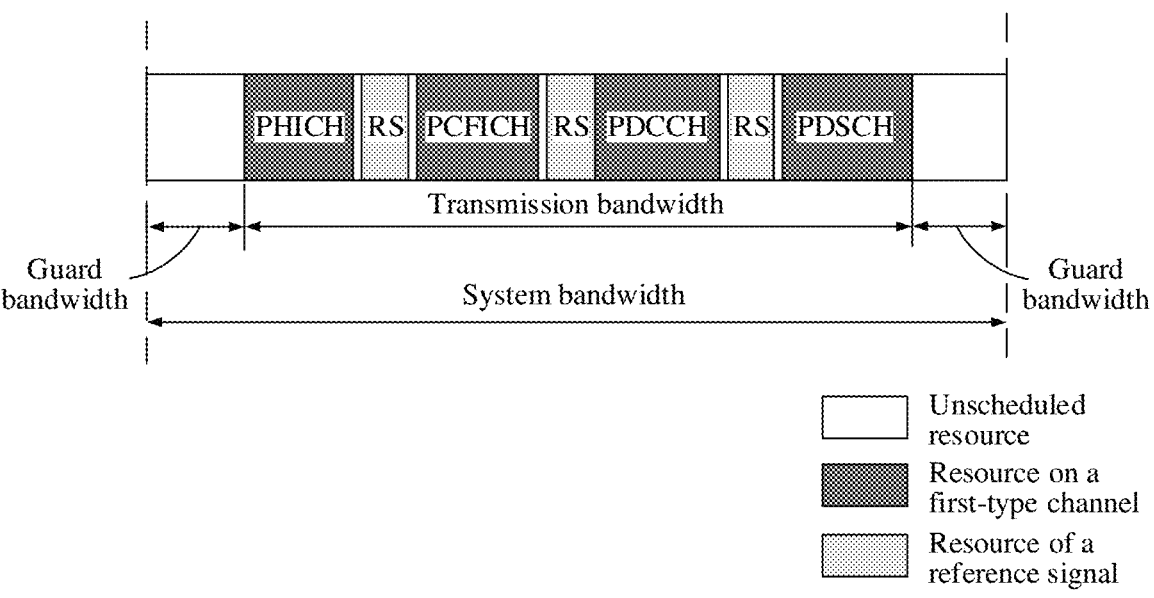
FIG. 5A is a schematic diagram of an embodiment of a resource on a first-type channel in transmission bandwidth according to this application.

In addition, the low-order modulation is usually used for a data channel and a control channel. The resource on the first-type channel may include a resource on the data channel and/or a resource on the control channel. Specifically, the resource on the first-type channel may include only a frequency domain resource on the data channel, may include only a frequency domain resource on the control channel, or may include both the frequency domain resource on the data channel and the frequency domain resource on the control channel. For example, the control channel may include one or more of a physical hybrid automatic repeat indicator channel (PHICH), a physical control format indicator channel (PCFICH), and a physical downlink control channel (PDCCH). The data channel may be a physical downlink shared channel (PDSCH). As shown in FIG. 5A, the resource on the first-type channel may include one or more of a resource on the PHICH, a resource on the PCFICH, a resource on the PDCCH, and a resource on the PDSCH. It should be noted that the low-order modulation is usually not used for a resource of a reference signal (reference signal, RS), and the resource on the first-type channel in this application does not include the resource of the RS.

In this embodiment, the communication apparatus may select a part of the resource on the first-type channel as the reserved resource.

In a possible implementation, the communication apparatus may select one or more resource blocks RBs on the resource on the data channel as the reserved resource, may select one or more resource blocks RBs on the resource on the control channel as the reserved resource, or may respectively select a plurality of resource blocks RBs on the resource on the data channel and the resource on the control channel as the reserved resource. In addition, the communication apparatus may select the reserved resource at a granularity of a resource block RB, may select the reserved resource at a granularity of a subcarrier, or may select the reserved resource at a granularity of a resource element RE. This is not specifically limited herein.

For example, as shown in FIG. 5A, the communication apparatus may select one or more RBs from the resource on the PHICH as the reserved resource, may select one or more RBs from the resource on the PCFICH as the reserved resource, may select one or more RBs from the resource on the PDCCH as the reserved resource, or may select one or more RBs from the resource on the PDSCH as the reserved resource.

For example, as shown in FIG. 5A, the communication apparatus may select one or more RBs from one or more of the resource on the PHICH, the resource on the PCFICH, the resource on the PDCCH, and the resource on the PDSCH as the reserved resource.

In another possible implementation, the communication apparatus may alternatively select, based on a rule, a part of the resource on the first-type channel as the reserved resource.

Specifically, the communication apparatus determines the reserved resource based on the resource on the first-type channel and a second preset resource, where the second preset resource is a resource whose anti-interference capability meets a preset condition. The second preset resource may be determined based on analog simulation, or may be an empirical value. This is not specifically limited herein.

Figure 5B:
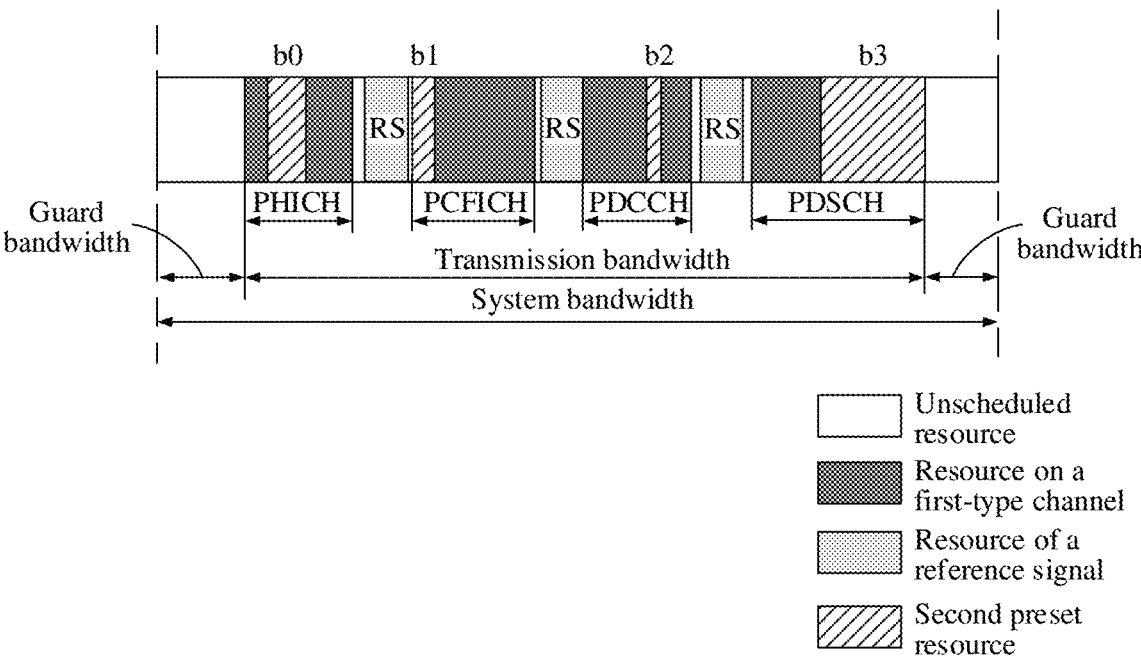
FIG. 5B is a diagram of an example of a second preset resource according to this application.
Figure 5C:
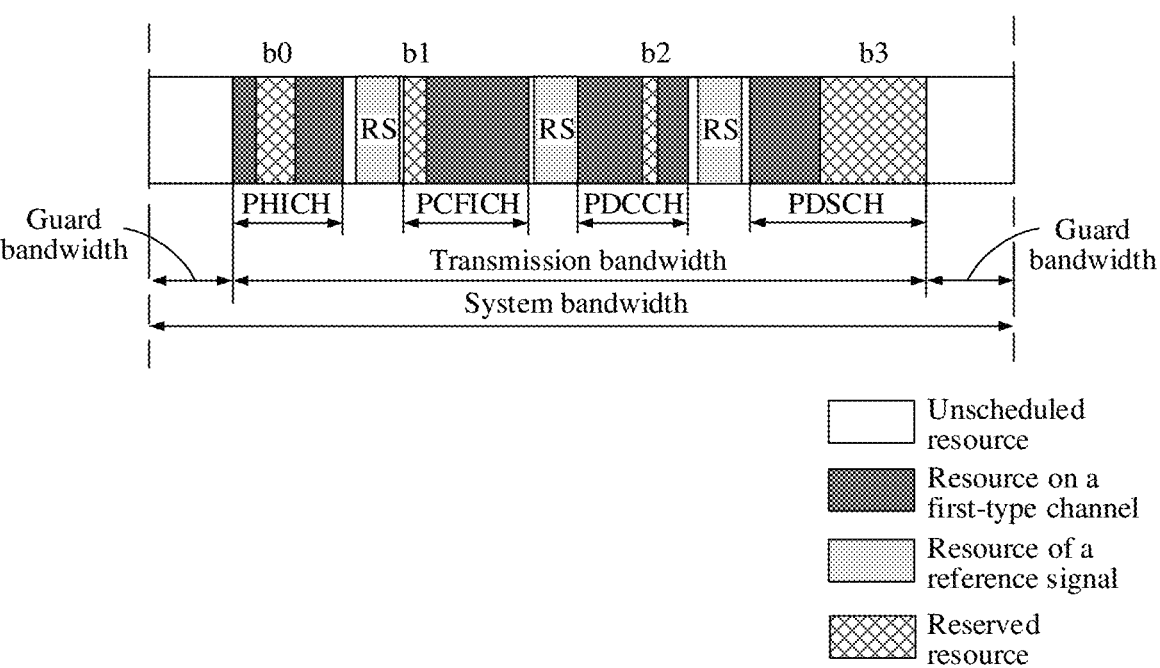
FIG. 5C is a schematic diagram of another embodiment of a determined reserved resource according to this application.

In addition, the second preset resource includes the resource on the first-type channel in the transmission bandwidth. FIG. 5B is used as an example. A resource b0 is a part of frequency domain resources in the resource on the PHICH, a resource b1 is a part of frequency domain resources in the resource on the PCFICH, a resource b2 is a part of frequency domain resources in the resource on the PDCCH, and a resource b3 is a part of frequency domain resources in the resource on the PDSCH. It is assumed that the second preset resource is a resource set including the resource b0, the resource b1, the resource b2, and the resource b3. In this case, as shown in FIG. 5C, the reserved resource may be an intersection set of the resource on the first-type channel and the second preset resource, to be specific, the reserved resource is a resource set including the resource b0, the resource b1, the resource b2, and the resource b3.

Optionally, the second preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal. As shown in FIG. 5B, an example in which the second preset resource includes the resource b0, the resource b1, the resource b2, and the resource b3 is used. In this case, the second preset resource includes four groups of consecutive frequency domain resources, and a quantity of subcarriers included in the resource b0 is not necessarily the same as a quantity of subcarriers included in the resource b1. Similarly, a quantity of subcarriers included in another group of resources is not necessarily the same.

It is assumed that the second preset resource is the resource set including the resource b0, the resource b1, the resource b2, and the resource b3.

Optionally, the second preset resource includes a plurality of subcarriers, and a quantity of subcarriers in a spacing between every two adjacent subcarriers in the plurality of subcarriers is not completely equal. FIG. 5B is used as an example. A quantity of subcarriers in a spacing between the $1^{st}$ subcarrier in the resource b0 and the $1^{st}$ subcarrier in the resource b1 is not necessarily equal to a quantity of subcarriers in a spacing between the $1^{st}$ subcarrier in the resource b1 and the $1^{st}$ subcarrier in the resource b2. In this implementation, the plurality of subcarriers in the second preset resource are arranged in an unequal-spacing manner, in other words, a plurality of subcarriers in a second frequency domain resource are arranged in a non-uniform manner, to help suppress wave peak regeneration, and help improve efficiency of reducing the peak-to-average power ratio (PAPR).

It should be understood that a frequency domain position of the second preset resource may be stored in the communication apparatus as a template, and the communication apparatus stores frequency domain positions of one or more second preset resources. The communication apparatus may store an index value of a resource group, an index value of a resource block, or an index value of a subcarrier. This is not specifically limited herein.

For example, the second preset resource in FIG. 5B may be stored in the communication apparatus in a manner shown in Table 3-1.

TABLE 3-1

| Index value of a resource group | b0 | b1 | b2 | b3 |
|---|---|---|---|---|
| Index value of an RB | 9 to 11 | 20 and 21 | 30 to 32 | 40 to 46 |

For example, the frequency domain position of the second preset resource may be alternatively stored in the communication apparatus in a form of a bitmap.

It should be understood that, during actual application, processing such as compression may be performed on the frequency domain position of the second preset resource. Therefore, a storage form of the second preset resource in the communication apparatus is not limited in this application.

Step 402: Generate a peak suppressing signal based on the reserved resource.

In this embodiment, the communication apparatus generates the peak suppressing signal on the reserved resource.

Step 403: Adjust, based on the peak suppressing signal, a peak-to-average power ratio (PAPR) of a to-be-transmitted data signal.

In this embodiment, the communication apparatus superimposes, on the to-be-transmitted data signal, the peak suppressing signal generated on the reserved resource, to obtain a data signal whose peak-to-average power ratio (PAPR) is reduced.

Step 404: Adjust an operating voltage of a power amplifier or an average transmit power of the data signal based on an adjusted peak-to-average power ratio (PAPR).

In this embodiment, step 404 is an optional step. In other words, after the communication apparatus adjusts, based on the peak suppressing signal, the peak-to-average power ratio (PAPR) of the to-be-transmitted data signal, the communication apparatus may further adjust a parameter of the transmitting system to improve performance of the transmitting system. The parameter of the transmitting system includes the operating voltage of the power amplifier and the average transmit power of the data signal.

In a possible implementation, the power amplifier stores a table of a correspondence relationship between a PAPR level and the operating voltage. If the communication apparatus reduces the PAPR, the communication apparatus may send an adjustment indication to the power amplifier, to indicate the power amplifier to adjust the operating voltage to an operating voltage corresponding to a PAPR level, so as to improve operating performance of the transmitting system. For an example of the table of the correspondence relationship between the PAPR level and the operating voltage, refer to Table 2-1 in step 204. Details are not described herein again.

In another possible implementation, the communication apparatus stores a table of a correspondence relationship between a PAPR level and an average transmit power. If the communication apparatus reduces the PAPR, the communication apparatus may reduce the average transmit power of the data signal, so that the power amplifier uses a low average transmit power when amplifying the data signal, to improve the operating performance of the transmitting system. For an example of the table of the correspondence relationship between the PAPR level and the operating voltage, refer to Table 2-2 in step 204. Details are not described herein again.

In this embodiment, the lower-order modulation is used for data and/or a channel transmitted on the resource on the first-type channel, and the anti-interference capability is strong. Therefore, when a peak suppressing signal is generated on the resource on the first-type channel, not only effect of reducing the peak-to-average power ratio (PAPR) can be achieved, but also a demodulation process on a receiving side (for example, a terminal device) does not suffer great interference. In other words, the receiving side can still obtain a data signal by demodulating the first-type channel that carries the data signal and the peak suppressing signal. A fixed reserved resource in a conventional technology does not need to be used. Therefore, flexibility of determining the reserved resource is improved. In addition, the receiving side (for example, the terminal device) receives the data or the signaling by using the resource on the first-type channel. Therefore, the behavior of the receiving side (for example, the terminal device) does not need to be modified when the resource on the first-type channel is used to determine the reserved resource.

Figure 6:
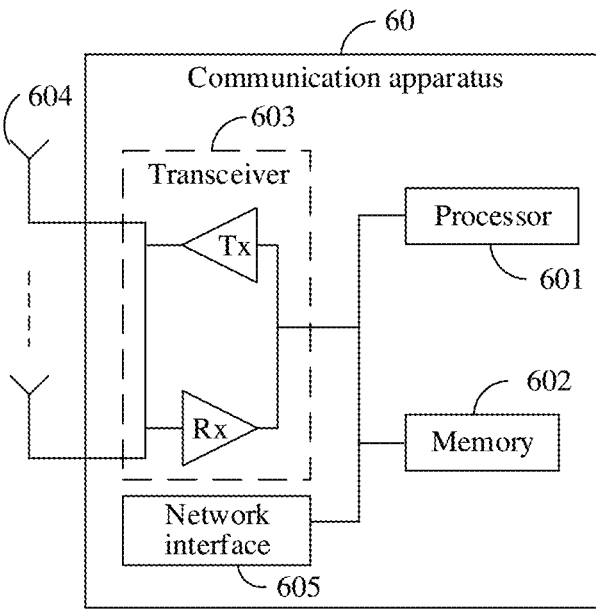
FIG. 6 is a schematic diagram of an embodiment of a communication apparatus according to this application.

FIG. 6 is a schematic diagram of a structure of another communication apparatus 60 according to an embodiment. It should be understood that, the communication apparatus 60 may be the network device or the baseband processing unit BBU in the network device in the method embodiment corresponding to FIG. 2 or FIG. 4.

The communication apparatus 60 includes at least one processor 601, at least one memory 602, at least one transceiver 603, at least one network interface 605, and one or more antennas 604. The processor 601, the memory 602, the transceiver 603, and the network interface 605 are connected by using a connection apparatus, and the antenna 604 is connected to the transceiver 603. The connection apparatus may include various types of interfaces, transmission cables, buses, or the like. This is not limited in this embodiment.

The memory 602 is mainly configured to store a software program and data. The memory 602 may exist independently and is connected to the processor 601. Optionally, the memory 602 may be integrated with the processor 601, for example, integrated into one or more chips. The memory 602 can store program code for executing the technical solutions in embodiments of this application, and the processor 601 controls the execution. Various types of executed computer program code may also be considered as drivers of the processor 601. It should be understood that FIG. 6 in this embodiment shows only one memory and one processor. However, during actual application, the communication apparatus 60 may include a plurality of processor or a plurality of memory. This is not specifically limited herein. In addition, the memory 602 may also be referred to as a storage medium, a storage device, or the like. The memory 602 may be a storage element located in a same chip as the processor (namely, an on-chip storage element), or may be an independent storage element. This is not limited in embodiments of this application.

In this embodiment, the transceiver 603 may be configured to support receiving or sending of a radio frequency signal between the communication apparatus 60 and a receiving side (for example, a terminal device), and the transceiver 603 may be connected to the antenna 604. The transceiver 603 includes a transmitter Tx and a receiver Rx. Specifically, the one or more antennas 604 may receive the radio frequency signal. The receiver Rx of the transceiver 603 is configured to receive the radio frequency signal from the antenna 604, convert the radio frequency signal into a digital baseband signal or a digital intermediate frequency signal, and provide the digital baseband signal or the digital intermediate frequency signal to the processor 601, so that the processor 601 further processes, for example, demodulates or decodes, the digital baseband signal or the digital intermediate frequency signal. In addition, the transmitter Tx in the transceiver 603 is further configured to receive a modulated digital baseband signal or digital medium-frequency signal from the processor 601, convert the modulated digital baseband signal or digital medium-frequency signal into a radio frequency signal, and send the radio frequency signal by using the one or more antennas 604. Specifically, the receiver Rx may selectively perform one-level or multi-level down frequency mixing processing and analog-to-digital conversion processing on the radio frequency signal to obtain a digital baseband signal or a digital intermediate frequency signal, and a sequence of the down frequency mixing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

It should be understood that the transceiver 603 may also be referred to as a transceiver unit, a transceiver machine, a transceiver apparatus, or the like. Optionally, a component configured to implement a receiving function in the transceiver unit may be considered as a receiving unit, and a component configured to implement a sending function in the transceiver unit may be considered as a sending unit. In other words, the transceiver unit includes a receiving unit and a sending unit. The receiving unit may also be referred to as a receiver, an input port, a receiving circuit, or the like. The sending unit may be referred to as a transmitter machine, a transmitter, a transmission circuit, or the like.

In addition, the processor 601 is mainly configured to process a communication protocol and communication data, control an entire network device, execute a software program, and process data of the software program, for example, configured to support the communication apparatus 60 in performing an action described in the foregoing embodiments. The communication apparatus 60 may include a baseband processor and a central processing unit. The baseband processor is mainly configured to process a communication protocol and communication data, and the central processing unit is mainly configured to control the entire communication apparatus 60, execute a software program, and process data of the software program. Functions of the baseband processor (for example, a baseband processing unit BBU) and the central processing unit (for example, a CPU) may be integrated into the processor 601 in FIG. 6. A person skilled in the art may understand that the baseband processor and the central processing unit may alternatively be independent processors, and are interconnected by using a technology such as a bus. A person skilled in the art may understand that the communication apparatus 60 may include a plurality of baseband processors to adapt to different network standards, the communication apparatus 60 may include a plurality of central processing units to improve a processing capability of the communication apparatus 60, and components of the communication apparatus 60 may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program. The processor executes the software program to implement a baseband processing function.

In addition, the network interface 605 is configured to connect the communication apparatus 60 to another communication apparatus through a communication link. Specifically, the network interface 605 may include a network interface such as an S1 interface between the communication apparatus 60 and a core network element. The network interface 605 may alternatively include a network interface such as an X2 or Xn interface between the communication apparatus 60 and another network device (for example, another access network device or another core network element).

Specifically, the communication apparatus 60 may be configured to perform the method in the embodiment corresponding to FIG. 2. Specifically, in the communication apparatus 60, the processor 601 is configured to determine a reserved resource based on an unscheduled resource in system bandwidth, where the system bandwidth includes transmission bandwidth and guard bandwidth, and the unscheduled resource includes a first unscheduled resource in the transmission bandwidth and/or a second unscheduled resource in the guard bandwidth. The processor 601 is configured to generate a peak suppressing signal based on the reserved resource, and adjust, based on the peak suppressing signal, a peak-to-average power ratio (PAPR) of a to-be-transmitted data signal. In addition, the processor 601 sends, by using the transceiver 603, a data signal whose PAPR is adjusted.

In a possible implementation, the first unscheduled resource includes an unscheduled frequency domain resource in a resource on a data channel and/or an unscheduled frequency domain resource in a resource on a control channel. In this implementation, it is proposed that the unscheduled resource (to be specific, the first unscheduled resource) in the transmission bandwidth may include only the unscheduled frequency domain resource on the data channel, may include only the unscheduled frequency domain resource on the control channel, or may include both the unscheduled frequency domain resource on the data channel and the unscheduled frequency domain resource on the control channel. It should be understood that the first unscheduled resource may be caused by a channel resource allocation conflict, or may be caused because allocation is not performed due to poor link quality. This is not specifically limited in this application.

In a possible implementation, the processor 601 in the communication apparatus 60 may directly determine the unscheduled resource in the system bandwidth as the reserved resource. Optionally, when the unscheduled resource includes only the first unscheduled resource, the processor 601 may determine the first unscheduled resource as the reserved resource. Optionally, when the unscheduled resource includes only the second unscheduled resource, the processor 601 may determine the second unscheduled resource as the reserved resource. Optionally, when the unscheduled resource includes only the first unscheduled resource and the second unscheduled resource, the processor 601 may determine a resource set including the first unscheduled resource and the second unscheduled resource as the reserved resource.

In a possible implementation, processor 601 in the communication apparatus 60 may alternatively select, based on a rule, a part of the unscheduled resource in the system bandwidth as the reserved resource. Specifically, the processor 601 determines the reserved resource based on the unscheduled resource and a first preset resource, where the first preset resource is a frequency domain resource whose probability of being scheduled is less than a preset value. In this implementation, it is proposed that the communication apparatus 60 may select a part of the unscheduled resource as the reserved resource with reference to the preset resource (to be specific, the first preset resource). That the first preset resource is a frequency domain resource whose probability of being scheduled is low may also be understood as that there is a high probability that each subcarrier in the first preset resource does not participate in scheduling. In different scheduling periodicities, unscheduled resources generated in the transmission bandwidth are not completely the same. Therefore, if the reserved resource is determined from the unscheduled resource with reference to the first preset resource, a resource that does not often participate in scheduling may be filtered from the unscheduled resource. This helps ensure relative stability of the determined reserved resource, and the reserved resource determined by a transmitting side (for example, a base station) does not remain unchanged. Therefore, flexibility of determining the reserved resource is improved, and it can also be ensured that a receiving side (for example, a terminal device) is not affected.

Optionally, the first preset resource includes a plurality of subcarriers, and a quantity of subcarriers in a spacing between every two adjacent subcarriers in the plurality of subcarriers is not completely equal. Further, if the plurality of subcarriers in the first preset resource are arranged in an unequal-spacing manner, in other words, a plurality of subcarriers in a first frequency domain resource are arranged in a non-uniform manner, suppression of wave peak regeneration is facilitated, and improving of efficiency of reducing the peak-to-average power ratio (PAPR) is facilitated.

In a possible implementation, the first preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal. In this implementation, it is proposed that the consecutive subcarriers may exist in the first preset resource, but not all subcarriers are consecutive. The consecutive subcarriers help improve the efficiency of reducing the peak-to-average power ratio (PAPR), and different subcarriers included in different groups of frequency domain resources help form an arrangement manner of unequal spacings, so that wave peak regeneration is avoided, and the efficiency of reducing the peak-to-average power ratio (PAPR) can also be improved to some extent.

In a possible implementation, the first preset resource includes a frequency domain resource that is in the transmission bandwidth and that does not participate in scheduling and/or a frequency domain resource that is in the guard bandwidth and that does not participate in scheduling. In this implementation, it is proposed that the first preset resource may include the frequency domain resource that is in the transmission bandwidth and that does not participate in scheduling, or may include the frequency domain resource that is in the guard bandwidth and that does not participate in scheduling. Optionally, the first preset resource may include both the two frequency domain resources. In this implementation, a plurality of manners of determining the first preset resource are provided, and a plurality of rules for determining the reserved resource are indirectly provided, to help improve the flexibility of determining the reserved resource.

In a possible implementation, the processor 601 in the communication apparatus 60 determines an intersection set of the unscheduled resource and the first preset resource as the reserved resource. In this implementation, it is proposed that the communication apparatus 60 determines the intersection set of the unscheduled resource and the first preset resource as the reserved resource. In this implementation, it can be ensured that the reserved resource is an unscheduled frequency domain resource in the system bandwidth, and it can also be ensured that the reserved resource is a resource whose probability of being scheduled is low. In addition, a manner of determining the reserved resource by obtaining the intersection set of the unscheduled resource and the first preset resource is easy to operate, and helps avoid increasing complexity of determining the reserved resource by the communication apparatus 60.

In a possible implementation, the second unscheduled resource includes a first frequency domain resource that is in the guard bandwidth and that is adjacent to the transmission bandwidth, and a frequency domain resource quantity of the first frequency domain resource is less than a frequency domain resource quantity in the guard bandwidth. That the communication apparatus 60 determines a reserved resource based on an unscheduled resource in system bandwidth may be specifically the communication apparatus 60 determines the first frequency domain resource in the second unscheduled resource as the reserved resource. In this implementation, it is proposed that the communication apparatus 60 may further determine a part of frequency domain resources (to be specific, the first frequency domain resource) that is in the guard bandwidth and that is closely adjacent to the transmission bandwidth as the reserved resource. That the first frequency domain resource is closely adjacent to (or adjacent to) the transmission bandwidth indicates that no frequency domain resource exists between the first frequency domain resource and the transmission bandwidth. The communication apparatus 60 selects, from the guard bandwidth, the part of frequency domain resources that is closely adjacent to the transmission bandwidth as the reserved resource, instead of directly using all the guard bandwidth as the reserved resource, to help reduce not only interference to a signal in another frequency band (for example, a frequency band other than the system bandwidth), but also a requirement of a filter of a transmitting system of the communication apparatus 60.

In a possible implementation, after the communication apparatus 60 adjusts, based on the peak suppressing signal, the peak-to-average power ratio (PAPR) of the to-be-transmitted data signal, the communication apparatus 60 may further adjust a parameter of the transmitting system to improve performance of the transmitting system. Specifically, an operating voltage of a power amplifier may be adjusted based on an adjusted peak-to-average power ratio (PAPR), or an average transmit power of the data signal may be adjusted based on an adjusted peak-to-average power ratio (PAPR).

Specifically, the communication apparatus 60 may be configured to perform the method in the embodiment corresponding to FIG. 4. Specifically, in the communication apparatus 60, the processor 601 is configured to determine a reserved resource based on a resource on a first-type channel in transmission bandwidth, where lower-order modulation is used for data and/or signaling scheduled on the first-type channel. The processor 601 is configured to generate a peak suppressing signal based on the reserved resource, and adjust, based on the peak suppressing signal, a peak-to-average power ratio (PAPR) of a to-be-transmitted data signal. In addition, the processor 601 sends, by using the transceiver 603, a data signal whose PAPR is adjusted.

In a possible implementation, the resource on the first-type channel includes a resource on a data channel and/or a resource on a control channel. In this implementation, it is proposed that the resource on the first-type channel may include only a frequency domain resource on the data channel, may include only a frequency domain resource on the control channel, or may include both the frequency domain resource on the data channel and the frequency domain resource on the control channel.

In a possible implementation, the processor 601 in the communication apparatus 60 may alternatively select, based on a rule, a part of the resource on the first-type channel as the reserved resource. Specifically, the processor 601 determines the reserved resource based on the resource on the first-type channel and a second preset resource, where second preset resource is a resource whose anti-interference capability meets a preset condition. In this implementation, it is proposed that the communication apparatus 60 may select a part of the resource on the first-type channel as the reserved resource with reference to a preset resource (to be specific, the second preset resource). That the second preset resource is a resource whose anti-interference capability meets a preset condition may also be understood as that an anti-interference capability of a channel carried on the second preset resource is strong. In different scheduling periodicities, resources corresponding to channels that have a strong anti-interference capability and that are generated in the transmission bandwidth are not completely the same. Therefore, if the reserved resource is determined from the resource on the first-type channel with reference to the second preset resource, a resource with a strong anti-interference capability can be selected from the resource on the first-type channel. This helps ensure relative stability of the determined reserved resource, the reserved resource determined by a transmitting side (for example, a base station) does not remain unchanged. Therefore, flexibility of determining the reserved resource is improved, and it can also be ensured that a receiving side (for example, a terminal device) is not affected.

Optionally, the second preset resource includes a plurality of subcarriers, and a quantity of subcarriers in a spacing between every two adjacent subcarriers in the plurality of subcarriers is not completely equal. Further, the plurality of subcarriers in a first preset resource are arranged in an unequal-spacing manner, in other words, a plurality of subcarriers in a first frequency domain resource are arranged in a non-uniform manner, to help suppress wave peak regeneration, and help improve efficiency of reducing the peak-to-average power ratio (PAPR).

In a possible implementation, the second preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal. In this implementation, it is proposed that the consecutive subcarriers may exist in the second preset resource, but not all subcarriers are consecutive. The consecutive subcarriers help improve the efficiency of reducing the peak-to-average power ratio (PAPR), and different subcarriers included in different groups of frequency domain resources help form an arrangement manner of unequal spacings, so that wave peak regeneration is avoided, and the efficiency of reducing the peak-to-average power ratio (PAPR) can also be improved to some extent.

In a possible implementation, the processor 601 in the communication apparatus 60 determines an intersection set of the resource on the first-type channel and the second preset resource as the reserved resource. In this implementation, it is proposed that the communication apparatus 60 determines an intersection set of the unscheduled resource and the second preset resource as the reserved resource. In this implementation, it can be ensured that the reserved resource is the resource on the first-type channel (to be specific, the resource using the lower-order modulation), and it can also be ensured that the reserved resource is a resource with a strong anti-interference capability. In addition, a manner of determining the reserved resource by obtaining the intersection set of the resource on the first-type channel and the second preset resource is easy to operate, and helps avoid increasing complexity of determining the reserved resource by the communication apparatus 60.

In a possible implementation, the lower-order modulation is binary phase shift keying BPSK modulation or quadrature phase shift keying QPSK modulation. In a possible implementation, after the communication apparatus 60 adjusts, based on the peak suppressing signal, the peak-to-average power ratio (PAPR) of the to-be-transmitted data signal, the communication apparatus 60 may further adjust a parameter of the transmitting system to improve performance of the transmitting system. Specifically, an operating voltage of a power amplifier may be adjusted based on an adjusted peak-to-average power ratio (PAPR), or an average transmit power of the data signal may be adjusted based on an adjusted peak-to-average power ratio (PAPR).

For other parts, refer to the method of the communication apparatus or the method of the transmitting side in the foregoing embodiments. Details are not described herein again.

Figure 7:
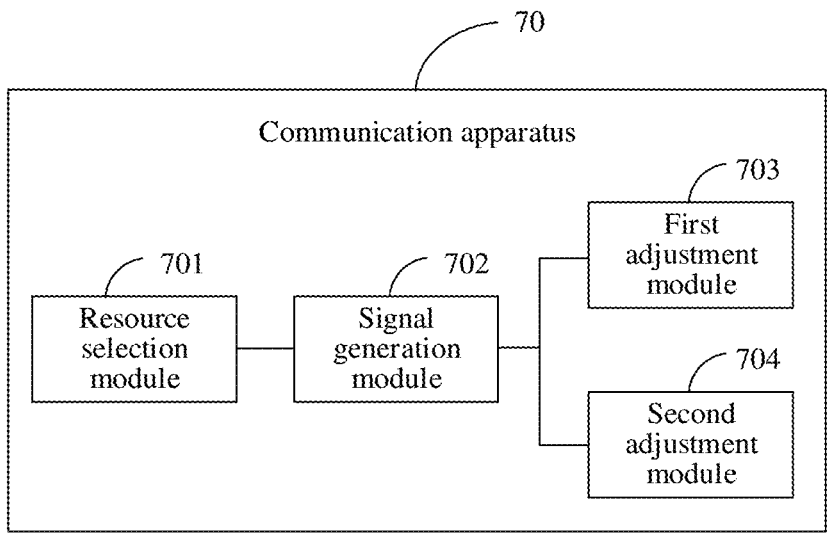
FIG. 7 is a schematic diagram of another embodiment of a communication apparatus according to this application.

As shown in FIG. 7, this application further provides another communication apparatus 70. The communication apparatus 70 may be a network device or a chip in the network device. Optionally, the network device is an access network device. The communication apparatus 70 includes a resource selection module 701 and a signal generation module 702.

Specifically, the communication apparatus 70 may be configured to perform the method in the embodiment corresponding to FIG. 2. The resource selection module 701 is configured to determine a reserved resource based on an unscheduled resource in system bandwidth, where the system bandwidth includes transmission bandwidth and guard bandwidth, and the unscheduled resource includes a first unscheduled resource in the transmission bandwidth and/or a second unscheduled resource in the guard bandwidth. The signal generation module 702 is configured to generate a peak suppressing signal based on the reserved resource, and adjust, based on the peak suppressing signal, a peak-to-average power ratio (PAPR) of a to-be-transmitted data signal.

In this embodiment, the reserved resource may be determined based on the first unscheduled resource in the transmission bandwidth and/or the second unscheduled resource in the guard bandwidth, and a fixed reserved resource in a conventional technology does not need to be used. Therefore, flexibility of determining the reserved resource can be improved. In addition, a receiving side (for example, a terminal device) does not receive data on the unscheduled resource (to be specific, the first unscheduled resource and the second unscheduled resource). Therefore, in a solution of determining the reserved resource based on the first unscheduled resource in the transmission bandwidth and/or the second unscheduled resource in the guard bandwidth, behavior of the receiving side does not need to be modified, and only a manner in which a transmitting side (for example, a base station) reserves a resource needs to be modified. Therefore, the flexibility of determining the reserved resource can be improved without increasing processing complexity of the receiving side.

In a possible implementation, the first unscheduled resource includes an unscheduled frequency domain resource in a resource on a data channel and/or an unscheduled frequency domain resource in a resource on a control channel.

In a possible implementation, the resource selection module 701 is specifically configured to determine the reserved resource based on the unscheduled resource and a first preset resource. The first preset resource is a frequency domain resource whose probability of being scheduled is less than a preset value. The first preset resource includes a plurality of subcarriers. A quantity of subcarriers in a spacing between every two adjacent subcarriers in the plurality of subcarriers is not completely equal.

In a possible implementation, the first preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal.

In a possible implementation, the first preset resource includes a frequency domain resource that is in the transmission bandwidth and that does not participate in scheduling and/or a frequency domain resource that is in the guard bandwidth and that does not participate in scheduling.

In a possible implementation, the resource selection module 701 is specifically configured to determine an intersection set of the unscheduled resource and the first preset resource as the reserved resource.

In a possible implementation, the second unscheduled resource includes a first frequency domain resource that is in the guard bandwidth and that is adjacent to the transmission bandwidth, and a frequency domain resource quantity of the first frequency domain resource is less than a frequency domain resource quantity in the guard bandwidth. The resource selection module 701 is specifically configured to determine the first frequency domain resource in the second unscheduled resource as the reserved resource.

In a possible implementation, the communication apparatus 70 further includes a first adjustment module 703, configured to adjust an operating voltage of a power amplifier based on an adjusted peak-to-average power ratio (PAPR), or a second adjustment module 704, configured to adjust an average transmit power of the data signal based on an adjusted peak-to-average power ratio (PAPR).

It should be noted that, for beneficial effects of the implementations in this embodiment, refer to the embodiment corresponding to FIG. 6. Details are not described herein again.

Specifically, the communication apparatus 70 may be configured to perform the method in the embodiment corresponding to FIG. 4. The resource selection module 701 is configured to determine the reserved resource based on a resource on a first-type channel in the transmission bandwidth, where lower-order modulation is used for data and/or signaling scheduled on the first-type channel. The signal generation module 702 is configured to generate a peak suppressing signal based on the reserved resource, and adjust, based on the peak suppressing signal, a peak-to-average power ratio (PAPR) of a to-be-transmitted data signal.

In a possible implementation, the resource on the first-type channel includes a resource on a data channel and/or a resource on a control channel.

In a possible implementation, the resource selection module 701 is specifically configured to determine the reserved resource based on the resource on the first-type channel and a second preset resource. The second preset resource includes a plurality of subcarriers. A quantity of subcarriers in a spacing between every two adjacent subcarriers in the plurality of subcarriers is not completely equal.

In a possible implementation, the second preset resource includes at least one group of consecutive frequency domain resources, each group of consecutive frequency domain resources includes a plurality of subcarriers with consecutive index values, and a quantity of subcarriers included in each group of consecutive frequency domain resources is not completely equal.

In a possible implementation, the resource selection module 701 is specifically configured to determine an intersection set of the resource on the first-type channel and the second preset resource as the reserved resource.

In a possible implementation, the lower-order modulation is binary phase shift keying BPSK modulation or quadrature phase shift keying QPSK modulation.

In a possible implementation, after adjusting, based on the peak suppressing signal, the peak-to-average power ratio (PAPR) of the to-be-transmitted data signal, the communication apparatus 70 further includes a first adjustment module 703, configured to adjust an operating voltage of a power amplifier based on an adjusted peak-to-average power ratio (PAPR), or a second adjustment module 704, configured to adjust an average transmit power of the data signal based on an adjusted peak-to-average power ratio (PAPR).

It should be noted that, for beneficial effects of the implementations in this embodiment, refer to the embodiment corresponding to FIG. 6. Details are not described herein again.

In an implementation process, steps in the foregoing methods can be implemented by using a hardware integrated logical circuit in the processor, or by using instructions in a form of software. The steps of the methods disclosed with reference to embodiments of this application may be directly performed by a hardware processor, or may be performed by a combination of hardware in the processor and a software module. A software module may be in a mature storage medium in the art, such as a random access memory, a flash memory, a read-only memory, a programmable read-only memory, an electrically erasable programmable memory, or a register. The storage medium is in the memory, and a processor reads information in the memory and completes the steps in the foregoing methods in combination with hardware of the processor. To avoid repetition, details are not described herein again. It should be further understood that first, second, and various numbers in this specification are merely used for differentiation for ease of description, and are not construed as a limitation on the scope of embodiments of this application.

In addition, this application provides a computer program product, and the computer program product includes one or more computer instructions. When the computer program instructions are loaded and executed on a computer, the procedure or functions according to embodiments of this application are all or partially generated. For example, the method related to the communication apparatus in FIG. 2 is implemented. For another example, the method related to the communication apparatus in FIG. 4 is implemented. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

In addition, this application further provides a computer-readable storage medium. The storage medium stores a computer program, and the computer program is executed by a processor to implement the method related to the communication apparatus in FIG. 2 or FIG. 4.

It should be understood that a term "and/or" in this specification describes only an association relationship between associated objects and represents that three relationships may exist. For example, data and/or signaling may represent the following three cases: Only data exists, both data and signaling exist, and only signaling exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be clearly understood by a person skilled in the art that, for a purpose of convenient and brief description, for a detailed working process of the foregoing system, apparatus, and unit, refer to a corresponding process in the foregoing method embodiments, and details are not described herein again.

The foregoing embodiments are merely intended for describing the technical solutions of this application, but not for limiting this application. Although this application is described in detail with reference to the foregoing embodiments, a person of ordinary skill in the art should understand that the person may still make modifications to the technical solutions described in the foregoing embodiments or make equivalent replacements to some technical features thereof, without departing from the spirit and scope of the technical solutions of embodiments of this application.

What is claimed is:

1. A method for reducing a peak-to-average power ratio (PAPR), wherein the method comprises:

determining a reserved resource based on an unscheduled resource in a system bandwidth, wherein the system bandwidth comprises transmission bandwidth and guard bandwidth, wherein the unscheduled resource comprises a first unscheduled resource in the transmission bandwidth or a second unscheduled resource in the guard bandwidth, wherein the determining the reserved resource based on the unscheduled resource in the system bandwidth comprises determining the reserved resource based on the unscheduled resource and a first preset resource, wherein the first preset resource is a frequency domain resource whose probability of being scheduled is less than a preset value, wherein the first preset resource comprises a plurality of subcarriers, and wherein a quantity of subcarriers in a spacing between every two adjacent subcarriers in the plurality of subcarriers is not completely equal;

generating a peak suppressing signal based on the reserved resource; and adjusting, based on the peak suppressing signal, a peak-to-average power ratio (PAPR) of a to-be-transmitted data signal.

2. The method according to claim 1, wherein the first unscheduled resource comprises an unscheduled frequency domain resource in a resource on a data channel or an unscheduled frequency domain resource in a resource on a control channel.

3. The method according to claim 1, wherein the first preset resource comprises at least one group of consecutive frequency domain resources, wherein each group of consecutive frequency domain resources comprises a plurality of subcarriers with consecutive index values, and wherein a quantity of subcarriers in each group of consecutive frequency domain resources is not completely equal.

4. The method according to claim 1, wherein the first preset resource comprises at least one of a frequency domain resource that is in the transmission bandwidth and that does not participate in scheduling or a frequency domain resource that is in the guard bandwidth and that does not participate in scheduling.

5. The method according to claim 1, wherein the determining the reserved resource based on the unscheduled resource and the first preset resource comprises:

determining an intersection set of the unscheduled resource and the first preset resource as the reserved resource.

6. The method according to claim 1, wherein the second unscheduled resource comprises a first frequency domain resource that is in the guard bandwidth and that is adjacent to the transmission bandwidth, and wherein a frequency domain resource quantity of the first frequency domain resource is less than a frequency domain resource quantity in the guard bandwidth; and wherein the determining the reserved resource based on the unscheduled resource in system bandwidth comprises:

determining the first frequency domain resource in the second unscheduled resource as the reserved resource.

7. The method according to claim 1, further comprising performing, after the adjusting, based on the peak suppressing signal, the PAPR of the to-be-transmitted data signal, at least one of:

adjusting an operating voltage of a power amplifier based on an adjusted PAPR; or adjusting an average transmit power of the data signal based on an adjusted PAPR.

8. A communication apparatus, comprising:

at least one processor; and at least one non-transitory computer readable memory connected to the at least one processor and including computer program code, wherein the at least one non-transitory computer readable memory and the computer program code are configured, with the at least one processor, to cause the communication apparatus to perform at least:

determining a reserved resource based on an unscheduled resource in system bandwidth, wherein the system bandwidth comprises transmission bandwidth and guard bandwidth, and wherein the unscheduled resource comprises a first unscheduled resource in the transmission bandwidth or a second unscheduled resource in the guard bandwidth, wherein the determining the reserved resource based on the unscheduled resource in the system bandwidth comprises determining the reserved resource based on the unscheduled resource and a first preset resource, wherein the first preset resource is a frequency domain resource whose probability of being scheduled is less than a preset value, wherein the first preset resource comprises a plurality of subcarriers, and wherein a quantity of subcarriers in a spacing between every two adjacent subcarriers in the plurality of subcarriers is not completely equal;

generating a peak suppressing signal based on the reserved resource; and adjusting, based on the peak suppressing signal, a peak-to-average power ratio (PAPR) of a to-be-transmitted data signal.

9. The communication apparatus according to claim 8, wherein the first unscheduled resource comprises an unscheduled frequency domain resource in a resource on a data channel or an unscheduled frequency domain resource in a resource on a control channel.

10. The communication apparatus according to claim 8, wherein the first preset resource comprises at least one group of consecutive frequency domain resources, wherein each group of consecutive frequency domain resources comprises a plurality of subcarriers with consecutive index values, and wherein a quantity of subcarriers comprised in each group of consecutive frequency domain resources is not completely equal.

11. The communication apparatus according to claim 8, wherein the first preset resource comprises a frequency domain resource that is in the transmission bandwidth and that does not participate in scheduling or a frequency domain resource that is in the guard bandwidth and that does not participate in scheduling.

12. A communication apparatus comprising:
at least one processor; and
at least one non-transitory computer readable memory connected to the at least one processor and including computer program code, wherein the at least one non-transitory computer readable memory and the computer program code are configured, with the at least one processor, to cause the communication apparatus to perform at least:
determining a reserved resource based on a resource on a first-type channel in transmission bandwidth, wherein lower-order modulation is used for data or signaling scheduled on the first-type channel, wherein the determining the reserved resource based on the resource on the first-type channel in the transmission bandwidth comprises determining the reserved resource based on the resource on the first-type channel and a second preset resource, wherein the second preset resource comprises a plurality of subcarriers, and wherein a quantity of subcarriers in a spacing between every two adjacent subcarriers in the plurality of subcarriers is not completely equal;
generating a peak suppressing signal based on the reserved resource; and
adjusting, based on the peak suppressing signal, a peak-to-average power ratio (PAPR) of a to-be-transmitted data signal.

13. The communication apparatus according to claim 12, wherein the resource on the first-type channel comprises a resource on a data channel or a resource on a control channel.

14. The communication apparatus according to claim 12, wherein the second preset resource comprises at least one group of consecutive frequency domain resources, wherein each group of consecutive frequency domain resources comprises a plurality of subcarriers with consecutive index values, and wherein a quantity of subcarriers in each group of consecutive frequency domain resources is not completely equal.

15. The communication apparatus according to claim 12, wherein the determining the reserved resource based on the resource on the first-type channel and the second preset resource comprises:
determining an intersection set of the resource on the first-type channel and the second preset resource as the reserved resource.

16. The communication apparatus according to claim 12, wherein the lower-order modulation is binary phase shift keying (BPSK) modulation or quadrature phase shift keying (QPSK) modulation.

17. The communication apparatus according to claim 12, wherein the at least one non-transitory computer readable memory and the computer program code are further configured, with the at least one processor, to cause the communication apparatus to perform at least:
adjusting an operating voltage of a power amplifier based on an adjusted PAPR; or
adjusting an average transmit power of the data signal based on an adjusted PAPR.

\* \* \* \* \*